US008231448B2

(12) United States Patent
Cuddy et al.

(10) Patent No.: US 8,231,448 B2
(45) Date of Patent: Jul. 31, 2012

(54) GAMING SYSTEM AND METHOD FOR PROVIDING PURCHASABLE BONUS OPPORTUNITIES

(75) Inventors: Ryan W. Cuddy, Reno, NV (US); Eric S. Boese, Sparks, NV (US)

(73) Assignee: IGT, Reno, NV (US)

( * ) Notice: Subject to any disclaimer, the term of this patent is extended or adjusted under 35 U.S.C. 154(b) by 574 days.

(21) Appl. No.: 11/937,933

(22) Filed: Nov. 9, 2007

(65) Prior Publication Data

US 2009/0124385 A1 May 14, 2009

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ........................................................ 463/16

(58) Field of Classification Search .................... 463/17, 463/20–22, 42, 43

See application file for complete search history.

(56) References Cited

U.S. PATENT DOCUMENTS

| | | | |
|---|---|---|---|
| 4,335,809 | A | 6/1982 | Wain |
| 4,363,485 | A | 12/1982 | Edwall |
| 4,448,419 | A | 5/1984 | Telnaes |
| 4,593,904 | A | 6/1986 | Graves |
| 4,614,342 | A | 9/1986 | Takashima |
| 4,624,459 | A | 11/1986 | Kaufman |
| 4,695,053 | A | 9/1987 | Vazquez, Jr. et al. |
| 4,805,907 | A | 2/1989 | Hagiwara |
| 4,837,728 | A | 6/1989 | Barrie et al. |
| 4,926,327 | A | 5/1990 | Sidley |
| 4,948,133 | A | 8/1990 | Helm et al. |
| 5,042,809 | A | 8/1991 | Richardson |
| 5,083,271 | A | 1/1992 | Thacher et al. |
| 5,167,413 | A | 12/1992 | Fulton |
| 5,205,555 | A | 4/1993 | Hamano |

(Continued)

FOREIGN PATENT DOCUMENTS

AU 199650327 10/1997

(Continued)

OTHER PUBLICATIONS

"Anchor Games and IGT Release the Quintessential Dick Clark Game, 'American Bandstand'" article, written by Frank Legato, published in Strictly Slots, Jan. 2002.

(Continued)

*Primary Examiner* — David L Lewis
*Assistant Examiner* — Reginald Renwick
(74) *Attorney, Agent, or Firm* — Neal, Gerber & Eisenberg LLP

(57) ABSTRACT

A gaming system includes a plurality of linked gaming devices, each of the gaming devices including a primary game operable upon a primary game wager. The gaming devices of the gaming system enable a plurality of players to place primary game wagers on plays of the primary games. In one embodiment, each of the players is enabled to place optional second wagers on shared random determinations which occur independently of the primary games. The gaming devices display the primary game outcomes and provide the players with any awards associated with the primary game outcomes. The gaming system determines an outcome for the shared random determinations. In one embodiment, for each of the shared random determinations which results in a designated outcome, the gaming system provides a bonus award to each of the players who placed the second wager on the shared random determination.

9 Claims, 22 Drawing Sheets

U.S. PATENT DOCUMENTS

| | | | |
|---|---|---|---|
| 5,280,909 | A | 1/1994 | Tracy |
| 5,292,127 | A | 3/1994 | Kelly et al. |
| 5,342,047 | A | 8/1994 | Heidel et al. |
| 5,342,049 | A | 8/1994 | Wichinsky et al. |
| 5,344,144 | A | 9/1994 | Cannon |
| 5,449,173 | A | 9/1995 | Thomas et al. |
| 5,544,892 | A | 8/1996 | Breeding |
| 5,560,603 | A | 10/1996 | Seelig et al. |
| 5,564,700 | A | 10/1996 | Celona |
| 5,580,309 | A | 12/1996 | Piechowiak et al. |
| 5,593,349 | A | 1/1997 | Miguel et al. |
| 5,605,506 | A | 2/1997 | Hoorn et al. |
| 5,611,730 | A | 3/1997 | Weiss |
| 5,618,045 | A | 4/1997 | Kagan et al. |
| 5,628,684 | A | 5/1997 | Bouedec |
| 5,643,088 | A | 7/1997 | Vaughn et al. |
| 5,645,486 | A | 7/1997 | Nagao et al. |
| 5,655,961 | A | 8/1997 | Acres et al. |
| 5,664,998 | A | 9/1997 | Seelig et al. |
| 5,695,400 | A | 12/1997 | Fennell, Jr. et al. |
| 5,697,611 | A | 12/1997 | Kelly et al. |
| 5,700,007 | A | 12/1997 | Kelly et al. |
| 5,702,304 | A | 12/1997 | Acres et al. |
| 5,707,285 | A | 1/1998 | Place et al. |
| 5,741,183 | A | 4/1998 | Acres et al. |
| 5,752,882 | A | 5/1998 | Acres et al. |
| 5,766,074 | A | 6/1998 | Cannon et al. |
| 5,772,509 | A | 6/1998 | Weiss |
| 5,779,544 | A | 7/1998 | Seelig et al. |
| 5,779,549 | A | 7/1998 | Walker et al. |
| 5,820,459 | A | 10/1998 | Acres et al. |
| 5,830,063 | A | 11/1998 | Byrne |
| 5,836,817 | A | 11/1998 | Acres et al. |
| 5,876,284 | A | 3/1999 | Acres et al. |
| 5,911,418 | A | 6/1999 | Adams |
| 5,976,015 | A | 11/1999 | Seelig et al. |
| 5,984,782 | A | 11/1999 | Inoue |
| 5,997,400 | A | 12/1999 | Seelig et al. |
| 6,004,207 | A | 12/1999 | Wilson, Jr. et al. |
| 6,007,426 | A | 12/1999 | Kelly et al. |
| 6,012,982 | A | 1/2000 | Piechowiak et al. |
| 6,033,307 | A | 3/2000 | Vancura |
| 6,059,289 | A | 5/2000 | Vancura |
| 6,059,658 | A | 5/2000 | Mangano et al. |
| 6,077,163 | A | 6/2000 | Walker et al. |
| 6,089,976 | A | 7/2000 | Schneider et al. |
| 6,110,043 | A | 8/2000 | Olsen |
| 6,135,884 | A | 10/2000 | Hedrick et al. |
| 6,142,873 | A | 11/2000 | Weiss et al. |
| 6,142,874 | A | 11/2000 | Kodachi et al. |
| 6,146,273 | A * | 11/2000 | Olsen .............................. 463/27 |
| 6,152,823 | A | 11/2000 | Lacoste et al. |
| 6,162,122 | A | 12/2000 | Acres et al. |
| 6,174,237 | B1 | 1/2001 | Stephenson |
| 6,210,275 | B1 | 4/2001 | Olsen |
| 6,210,277 | B1 | 4/2001 | Stefan |
| 6,217,448 | B1 | 4/2001 | Olsen |
| 6,224,482 | B1 | 5/2001 | Bennett |
| 6,224,484 | B1 | 5/2001 | Okuda et al. |
| 6,231,442 | B1 | 5/2001 | Mayeroff |
| 6,231,445 | B1 | 5/2001 | Acres |
| 6,234,896 | B1 | 5/2001 | Walker et al. |
| 6,234,897 | B1 | 5/2001 | Frohm et al. |
| 6,238,288 | B1 | 5/2001 | Walker et al. |
| 6,270,409 | B1 | 8/2001 | Shuster |
| 6,270,411 | B1 | 8/2001 | Gura et al. |
| 6,279,910 | B1 | 8/2001 | De Keller |
| 6,319,127 | B1 | 11/2001 | Walker et al. |
| 6,336,863 | B1 | 1/2002 | Baerlocher et al. |
| 6,346,043 | B1 | 2/2002 | Colin et al. |
| 6,347,996 | B1 | 2/2002 | Gilmore et al. |
| 6,358,149 | B1 | 3/2002 | Schneider et al. |
| 6,364,314 | B1 | 4/2002 | Canterbury |
| 6,364,765 | B1 | 4/2002 | Walker et al. |
| 6,364,766 | B1 | 4/2002 | Anderson et al. |
| 6,364,767 | B1 | 4/2002 | Brossard et al. |
| 6,364,768 | B1 | 4/2002 | Acres et al. |
| 6,371,852 | B1 | 4/2002 | Acres |
| 6,375,187 | B1 | 4/2002 | Baerlocher |
| 6,375,567 | B1 | 4/2002 | Acres |
| 6,375,569 | B1 | 4/2002 | Acres |
| 6,379,245 | B2 | 4/2002 | De Keller |
| 6,386,974 | B1 | 5/2002 | Adams |
| 6,398,218 | B1 | 6/2002 | Vancura |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,416,408 | B2 | 7/2002 | Tracy et al. |
| 6,435,511 | B1 | 8/2002 | Vancura et al. |
| 6,443,837 | B1 | 9/2002 | Jaffe et al. |
| 6,454,651 | B1 | 9/2002 | Yoseloff |
| 6,464,582 | B1 | 10/2002 | Baerlocher et al. |
| 6,491,584 | B2 | 12/2002 | Graham et al. |
| 6,500,068 | B2 | 12/2002 | Walker et al. |
| 6,506,117 | B2 | 1/2003 | DeMar et al. |
| 6,506,118 | B1 | 1/2003 | Baerlocher et al. |
| 6,537,150 | B1 | 3/2003 | Luciano et al. |
| 6,565,434 | B1 | 5/2003 | Acres |
| 6,569,015 | B1 | 5/2003 | Baerlocher et al. |
| 6,572,471 | B1 | 6/2003 | Bennett |
| 6,572,473 | B1 | 6/2003 | Baerlocher |
| 6,575,832 | B1 | 6/2003 | Manfredi et al. |
| 6,582,306 | B1 | 6/2003 | Kaminkow |
| 6,599,193 | B2 | 7/2003 | Baerlocher et al. |
| 6,602,137 | B2 | 8/2003 | Kaminkow et al. |
| 6,605,002 | B2 | 8/2003 | Baerlocher |
| 6,607,195 | B2 | 8/2003 | Vancura |
| 6,607,438 | B2 | 8/2003 | Baerlocher et al. |
| 6,648,753 | B1 | 11/2003 | Tracy et al. |
| 6,648,754 | B2 | 11/2003 | Baerlocher et al. |
| 6,656,040 | B1 | 12/2003 | Brosnan et al. |
| 6,663,488 | B1 | 12/2003 | Adams |
| 6,692,003 | B2 | 2/2004 | Potter et al. |
| 6,692,354 | B2 | 2/2004 | Tracy et al. |
| 6,705,944 | B2 | 3/2004 | Luciano |
| 6,722,976 | B2 | 4/2004 | Adams |
| 6,726,563 | B1 | 4/2004 | Baerlocher et al. |
| 6,726,565 | B2 | 4/2004 | Hughs-Baird |
| 6,733,386 | B2 | 5/2004 | Cuddy et al. |
| 6,761,632 | B2 | 7/2004 | Basenmer et al. |
| 6,767,284 | B1 | 7/2004 | Koza |
| 6,769,983 | B2 | 8/2004 | Slomiany |
| 6,780,111 | B2 | 8/2004 | Cannon et al. |
| 6,786,824 | B2 | 9/2004 | Cannon |
| 6,790,140 | B1 | 9/2004 | Niwa |
| 6,817,948 | B2 | 11/2004 | Pascal et al. |
| 6,832,959 | B2 | 12/2004 | Baerlocher |
| 6,837,793 | B2 | 1/2005 | McClintic |
| 6,852,027 | B2 | 2/2005 | Kaminkow et al. |
| 6,869,357 | B2 | 3/2005 | Adams et al. |
| 6,887,154 | B1 | 5/2005 | Luciano, Jr. et al. |
| 6,893,341 | B2 | 5/2005 | Walker et al. |
| 6,899,625 | B2 | 5/2005 | Luciano, Jr. et al. |
| 6,902,478 | B2 | 6/2005 | McClintic |
| 6,908,390 | B2 | 6/2005 | Nguyen et al. |
| 6,923,724 | B2 | 8/2005 | Williams |
| 6,942,568 | B2 | 9/2005 | Baerlocher |
| 6,976,676 | B2 | 12/2005 | Adams |
| 6,984,174 | B2 | 1/2006 | Cannon et al. |
| 7,052,392 | B2 | 5/2006 | Tessmer et al. |
| 7,156,735 | B2 | 1/2007 | Brosnan et al. |
| 7,198,572 | B2 | 4/2007 | Walker et al. |
| 2001/0003709 | A1 | 6/2001 | Adams |
| 2001/0004606 | A1 | 6/2001 | Tracy et al. |
| 2001/0018361 | A1 | 8/2001 | Acres |
| 2002/0052234 | A1 | 5/2002 | Adams |
| 2002/0055381 | A1 | 5/2002 | Tarantino |
| 2002/0059252 | A1 | 5/2002 | Yamaguchi |
| 2002/0142826 | A1 | 10/2002 | Adams |
| 2002/0142830 | A1 | 10/2002 | Adams |
| 2002/0147040 | A1 | 10/2002 | Walker et al. |
| 2002/0151342 | A1 | 10/2002 | Tracy et al. |
| 2002/0177483 | A1 * | 11/2002 | Cannon ........................... 463/42 |
| 2002/0198038 | A1 | 12/2002 | Adams |
| 2003/0011127 | A1 | 1/2003 | Vancura et al. |
| 2003/0013520 | A1 | 1/2003 | Adams |
| 2003/0060264 | A1 | 3/2003 | Chilton et al. |

| | | | | |
|---|---|---|---|---|
| 2003/0060266 | A1 | 3/2003 | Baerlocher | |
| 2003/0060277 | A1 | 3/2003 | Webb et al. | |
| 2003/0100361 | A1 | 5/2003 | Sharpless et al. | |
| 2003/0104854 | A1 | 6/2003 | Cannon | |
| 2003/0104860 | A1 | 6/2003 | Cannon et al. | |
| 2003/0114216 | A1 | 6/2003 | Adams | |
| 2003/0114218 | A1 | 6/2003 | McClintic | |
| 2003/0114219 | A1 | 6/2003 | McClintic | |
| 2003/0114220 | A1 | 6/2003 | McClintic | |
| 2003/0119576 | A1 | 6/2003 | McClintic et al. | |
| 2003/0119581 | A1 | 6/2003 | Cannon et al. | |
| 2003/0125107 | A1 | 7/2003 | Cannon | |
| 2003/0130041 | A1 | 7/2003 | Pascal et al. | |
| 2003/0181231 | A1 | 9/2003 | Vancura et al. | |
| 2003/0186745 | A1 | 10/2003 | Nguyen et al. | |
| 2003/0220138 | A1 | 11/2003 | Walker et al. | |
| 2003/0228901 | A1 | 12/2003 | Walker et al. | |
| 2004/0033831 | A1 | 2/2004 | Tarantino | |
| 2004/0038733 | A1 * | 2/2004 | Walker et al. | 463/25 |
| 2004/0038734 | A1 | 2/2004 | Adams | |
| 2004/0048659 | A1 | 3/2004 | Seelig et al. | |
| 2004/0051240 | A1 | 3/2004 | Adams | |
| 2004/0106446 | A1 | 6/2004 | Cannon et al. | |
| 2004/0162130 | A1 | 8/2004 | Walker et al. | |
| 2004/0204226 | A1 | 10/2004 | Foster et al. | |
| 2004/0204235 | A1 * | 10/2004 | Walker et al. | 463/29 |
| 2005/0020340 | A1 | 1/2005 | Cannon | |
| 2005/0043088 | A1 | 2/2005 | Nguyen et al. | |
| 2005/0043089 | A1 | 2/2005 | Nguyen et al. | |
| 2005/0043094 | A1 | 2/2005 | Nguyen et al. | |
| 2005/0054429 | A1 | 3/2005 | Baerlocher et al. | |
| 2005/0059474 | A1 | 3/2005 | O'Halloran | |
| 2005/0079911 | A1 | 4/2005 | Nakatsu | |
| 2005/0085294 | A1 | 4/2005 | Walker et al. | |
| 2005/0101384 | A1 | 5/2005 | Parham | |
| 2005/0137014 | A1 | 6/2005 | Vetelainen | |
| 2005/0218590 | A1 | 10/2005 | O'Halloran et al. | |
| 2005/0233803 | A1 | 10/2005 | Yang | |
| 2006/0009283 | A1 | 1/2006 | Englman et al. | |
| 2006/0030399 | A1 | 2/2006 | Baerlocher | |
| 2006/0030959 | A1 | 2/2006 | Duhamel | |
| 2006/0030960 | A1 | 2/2006 | Duhamel et al. | |
| 2006/0069619 | A1 | 3/2006 | Walker et al. | |
| 2006/0082056 | A1 | 4/2006 | Kane et al. | |
| 2006/0105836 | A1 * | 5/2006 | Walker et al. | 463/25 |
| 2006/0177109 | A1 | 8/2006 | Storch | |
| 2006/0247955 | A1 | 11/2006 | Humphrey | |
| 2007/0054726 | A1 | 3/2007 | Muir et al. | |
| 2007/0117608 | A1 * | 5/2007 | Roper et al. | 463/16 |
| 2007/0167217 | A1 | 7/2007 | Kaminkow et al. | |
| 2008/0102916 | A1 | 5/2008 | Kovacs et al. | |
| 2008/0113768 | A1 | 5/2008 | Baerlocher | |

FOREIGN PATENT DOCUMENTS

| | | |
|---|---|---|
| EP | 0 981 119 | 2/2000 |
| EP | 1 186 329 | 2/2002 |
| EP | 1 513 116 | 3/2005 |
| EP | 1 624 421 | 2/2006 |
| GB | 2 322 217 | 12/1997 |
| NZ | 508626 | 11/2001 |
| WO | WO 96/25725 | 8/1996 |
| WO | WO 98/00210 | 1/1998 |
| WO | WO 98/51384 | 11/1998 |
| WO | WO 99/03078 | 1/1999 |
| WO | WO 02/17250 | 2/2002 |
| WO | WO 2006/017068 | 2/2006 |
| WO | WO 2006/088498 | 8/2006 |
| WO | WO 2006/121663 | 11/2006 |
| WO | WO 2007/082336 | 7/2007 |
| WO | WO 2008/045398 | 4/2008 |

OTHER PUBLICATIONS

American Bandstand game brochure, written by IGT in 2001.
Auction Fever advertisement, written by Sierra Design Group, available in 2004.
Description of Monopoly® Big Event™, printed from http://www.midwest-casino-slots.com/games/wms/big-event.htm, on Jun. 23, 2008, available prior to Nov. 9, 2007.
News Release: WMS Launches Online Monopoly(TM) Big Event(R) Player Promotion, written by WMS Gaming, available Jan. 7, 2001.
Press Your Luck Article, written by Strictly Slots, published in 2000.
Press Your Luck™ game description, printed from http://www.wms.com/games_participationgames.php on Jun. 23, 2008, available prior to Nov. 9, 2007.
The Big Shot! Jackpot Game advertisement, published by Aristocrat in 2002.

* cited by examiner

200

220

220

GAMING SYSTEM AND METHOD FOR PROVIDING PURCHASABLE BONUS OPPORTUNITIES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Many known gaming devices enable players to make one or more side bets or side wagers. Such side bets are typically additional wagers placed by the player for each individual play of the game. The player's side bet typically provides the player a chance of obtaining a supplemental award in the play of the game, in addition to the player's existing chance of obtaining an award from their regular wager. Certain gaming devices require players to place side bets to qualify for a type of game function or game event, such as a bonus game or a bonus feature.

Some known secondary games include a group gaming aspect, wherein a plurality of players playing at linked gaming machines participate in a group event for determining one or more awards. The players playing at such gaming machines have the opportunity to participate in a shared bonus event, such as a communal bonus game provided to the players upon a triggering condition.

To increase player enjoyment and excitement with gaming devices, it is desirable to provide new and different gaming systems which provide bonus awards to players.

SUMMARY

In various embodiments, the gaming system disclosed herein includes a central server, central controller or remote host configured to communicate with or be linked to a plurality of gaming machines or gaming devices. In another embodiment, the gaming system includes a plurality of linked gaming devices wherein one of the gaming devices acts as the central server or controller. In one embodiment, each of the gaming devices of the gaming system includes a primary game operable upon a primary game wager. In various embodiments, the primary games of the gaming devices may be the same games or different games. In operation, the gaming devices of the gaming system enable a plurality of players to place primary game wagers on plays of the primary games. In various embodiments, the system also enables each of the players to place an optional, separate second wager on shared independent random determinations. The gaming devices display the primary game outcomes and provide the players with any awards associated with the primary game outcomes. The gaming system also determines outcomes for the shared random determinations. In one embodiment, if the shared random determination outcome includes a designated outcome, the gaming system provides a bonus award to each of the players who placed the second or side wager. It should be appreciated that the shared random determinations occur independently of the primary games of the gaming devices.

It should be appreciated that, when a player places the optional second wager on the shared random determination, the second wager does not affect primary game play. The average expected payout of the primary game on each player's gaming device is based on the paytable employed for that primary game. The symbol combinations of the paytable, the probabilities of the symbol combinations occurring, and their respective awards determine the average expected payback for the primary game. Placing the second wager in addition to the primary game wager thus does not affect the paytable of the primary game.

In one embodiment, a plurality of gaming devices of the gaming system are arranged near or around, such as below, a shared display. The gaming devices enable a plurality of players to place primary game wagers on primary games which are displayed to the players on the respective display devices of their individual gaming devices. The gaming devices enable each of the players to place optional second wagers on shared random determinations. The gaming devices display the primary game outcomes and provide the players with any awards associated with the primary game outcomes. The gaming system makes the shared random determinations. In various embodiments, if any of the shared random determinations result in a designated outcome, the gaming system provides each of the players who placed the second wager with either (a) a determined bonus award, or (b) an opportunity to participate in a bonus event. In one embodiment, the bonus event is displayed for all the players to see on the shared display. In various other embodiments, the players who participate in the bonus event play or compete for one or more bonus awards.

In one example embodiment, the gaming system requires players to place the second wager on the shared random determinations with the primary game wagers. In another embodiment, the gaming system requires players to place the second wager within a designated qualification period. For example, the controller determines which players have placed the second wager in a five-second time period, and those players will be eligible to win the bonus award the next time the shared random determination occurs.

Accordingly, by placing the second wagers on the shared random determinations, players are purchasing the opportunity to win bonus awards in addition to the player's existing chance of winning any awards in the play of the primary game without affecting play in the primary game.

In one embodiment, the gaming system enables each of the players playing at one of the gaming devices to place optional second wagers to purchase a plurality of opportunities to win bonus awards. In such an embodiment, the gaming system enables each of the players to purchase their multiple bonus opportunities at the same time. In one such embodiment, the gaming system enables each of the players to select one of a plurality of different predefined second wager amounts. Each of the predefined second wager amounts is associated with a different number of bonus opportunities. Each player selects the predefined second wager amount corresponding to the number of bonus opportunities that player wishes to purchase. For example, a player can choose to purchase 5 bonus opportunities by placing a second wager amount of $5, 10 bonus opportunities by placing a second wager amount of $10, or 20 bonus opportunities by placing a second wager amount of $20.

In one such embodiment, concurrently as the players play the primary games, the gaming system makes the shared random determinations at predetermined time intervals. For example, in one embodiment, the gaming system provides each shared random determination once per half-second (i.e., two times per second). Each time the shared random determination results in a designated outcome, the gaming system provides each of the players who has at least one bonus opportunity remaining with a bonus award. In one embodiment, each shared random determination is displayed to the players. In another embodiment, each shared random determination is not displayed to the players. That is, the shared random determination occurs "behind the scenes," as the players play the primary games of their respective gaming devices. In one such embodiment, only the bonus awards won are displayed to the players.

In various embodiments, the number of opportunities that each player has remaining at any designated time is displayed to that player. As the gaming system causes the shared random determinations to occur, the number of bonus opportunities remaining for each player decrements. In other embodiments, rather than or in addition to displaying the number of opportunities remaining for each player, the amount of time remaining during which that player may win a bonus award is displayed to the player. For example, if a player purchases 20 bonus opportunities, and the gaming system causes the shared random determination to occur two times per second, the player has ten seconds during which the player can win one or more bonus awards. During that ten-second time period, for each shared random determination that results in a designated outcome, the gaming system provides a bonus award to the player. In one such embodiment, the gaming system displays to each player a countdown of the time remaining during which that player is eligible to win a bonus award.

In one embodiment, the gaming system enables each of the players to purchase additional bonus opportunities at any designated time. In such embodiments, players can continuously add on to their number of remaining bonus opportunities. In other embodiments, the gaming system only enables the players to make wagers to purchase bonus opportunities with wagers in the primary games.

It should be appreciated that, in various embodiments, the shared random determinations occur independently of the primary games. Therefore, as long as a player has bonus opportunities remaining (or time remaining during which the player is eligible to win a bonus award), a player can play the primary game at his or her own pace and still have the chance to win one or more bonus awards. In other embodiments, the players must make wagers on the primary game to make wagers on bonus opportunities. In such embodiments, the plays of primary games will not typically be one to one. For instance, in the above example, a primary game may be played by the player every 3 seconds, but 6 shared random determinations may occur in those 3 seconds (i.e., 2 shared random determinations occur per second).

It should also be appreciated that, in certain embodiments, the shared random determinations occur regardless of whether or not players are playing the primary games of the gaming devices. In such embodiments, if the determination is made to provide a bonus award, the gaming system determines whether or not there is at least one player playing at one of the gaming devices who is eligible to receive the award. In one embodiment, if there are no players playing at the gaming devices who are eligible to receive an award, the gaming system disregards the determination to provide the bonus award, and normal game play continues.

In one embodiment, the purchasable bonus opportunities are each associated with a multiplier. In such embodiments, when the gaming system randomly determines to provide a bonus award to any players who have bonus opportunities remaining, the amount of the bonus award that is provided to each player is based in part on the value of the multiplier associated with that player's bonus opportunity. For example, a player purchases a plurality of bonus opportunities, each associated with a 2× multiplier. If, based on the outcome of a shared random determination, the gaming system determines to provide a bonus award of 10 credits to each player who has at least one bonus opportunity remaining, the player will receive a total bonus award of 20 credits (i.e., the base bonus award of 10 credits modified by the 2× multiplier).

In one embodiment, there is a maximum number of bonus opportunities that each player may have at any designated time. In one such embodiment, if a player wishes to purchase a number of bonus opportunities which would cause the player's total number of bonus opportunities to exceed the maximum number, the gaming system enables the player to purchase the bonus opportunities but reduces that player's total number of bonus opportunities to a number that is equal to or lower than the maximum number of bonus opportunities. Additionally, the gaming system adjusts the multipliers associated with a portion of the reduced number of bonus opportunities. For example, a player playing at one of the gaming devices associated with the bonus event purchases 20 opportunities associated with a 1× multiplier. The maximum number of opportunities that each player can have at any designated time is 20 opportunities. If the player purchases 10 more bonus opportunities (i.e., for a total number of 30 purchased bonus opportunities−10 bonus opportunities above the maximum number permitted per player), the gaming device adjusts or weights the bonus opportunities opportunities, such that the player has 10 bonus opportunities associated with a 1× multiplier and 10 bonus opportunities associated with a 2× multiplier.

In such embodiments, the gaming system enables players to purchase bonus opportunities even if doing so will cause the player's total number of bonus opportunities to exceed the maximum number. The gaming system adjusts the total number of purchased opportunities such that there is a lesser number of opportunities with a higher multiplier. In one embodiment, this is done linearly or at a suitable equal ratio, as in the example above. However, it should be appreciated that the gaming system may adjust or weight the opportunities in any suitable manner, such that the player remains at or below the maximum number of opportunities.

It should be appreciated that the bonus awards of the present disclosure may be any suitable type of bonus awards including credits, gift certificates, or physical awards such as free dinners or mobile telephones. In certain embodiments, the bonus award includes any suitable bonus event or activity which provides the players playing at the gaming devices of the gaming system with the chance to win a bonus award. In one such embodiment, the bonus event is a group bonus game. In this embodiment, if the outcome of one of the shared random determinations includes a designated outcome, the gaming system enables each of the players who has at least one bonus opportunity remaining to participate in the group bonus game. In various embodiments, the group bonus game may be any suitable type of game, including but not limited to a slot, poker, blackjack, keno, or bingo game, a digit game, an auction, a trading game, a bidding game, or a competition game. In one embodiment, bonus awards are determined based on a separate paytable for the bonus event or bonus game. In one such embodiment, each of the players who participates in the bonus game wins an award. In another embodiment, less than all of the players who participate in the bonus game win a bonus award. The bonus game may be implemented and displayed to the players in any suitable manner.

Accordingly, the present disclosure provides a gaming system which enables multiple players to bet together on a shared random determination.

Additional features and advantages are described herein and will be apparent from the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
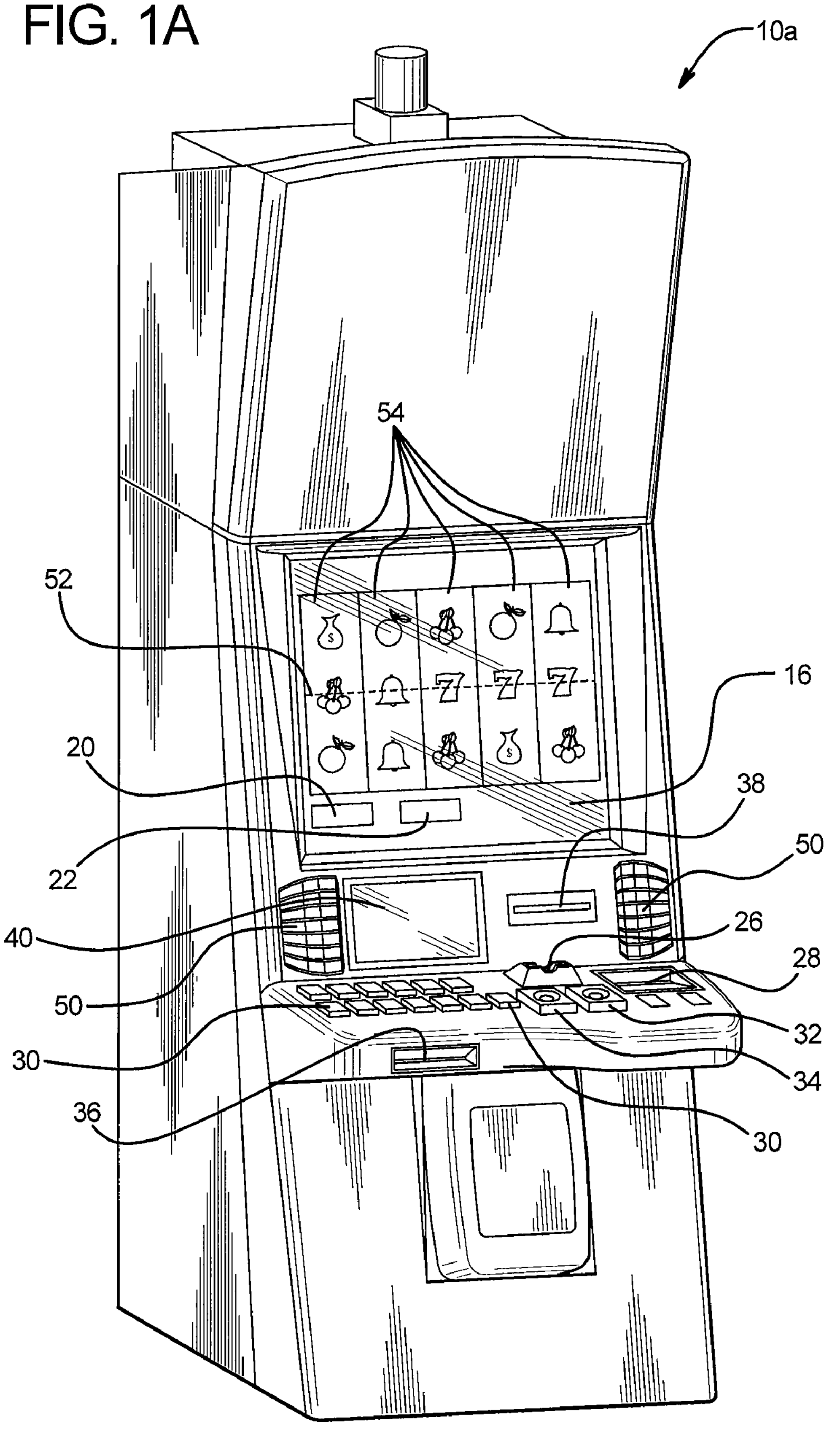
FIGS. 1A and 1B are perspective views of example alternative embodiments of the gaming device of the present disclosure.
Figure 1B:
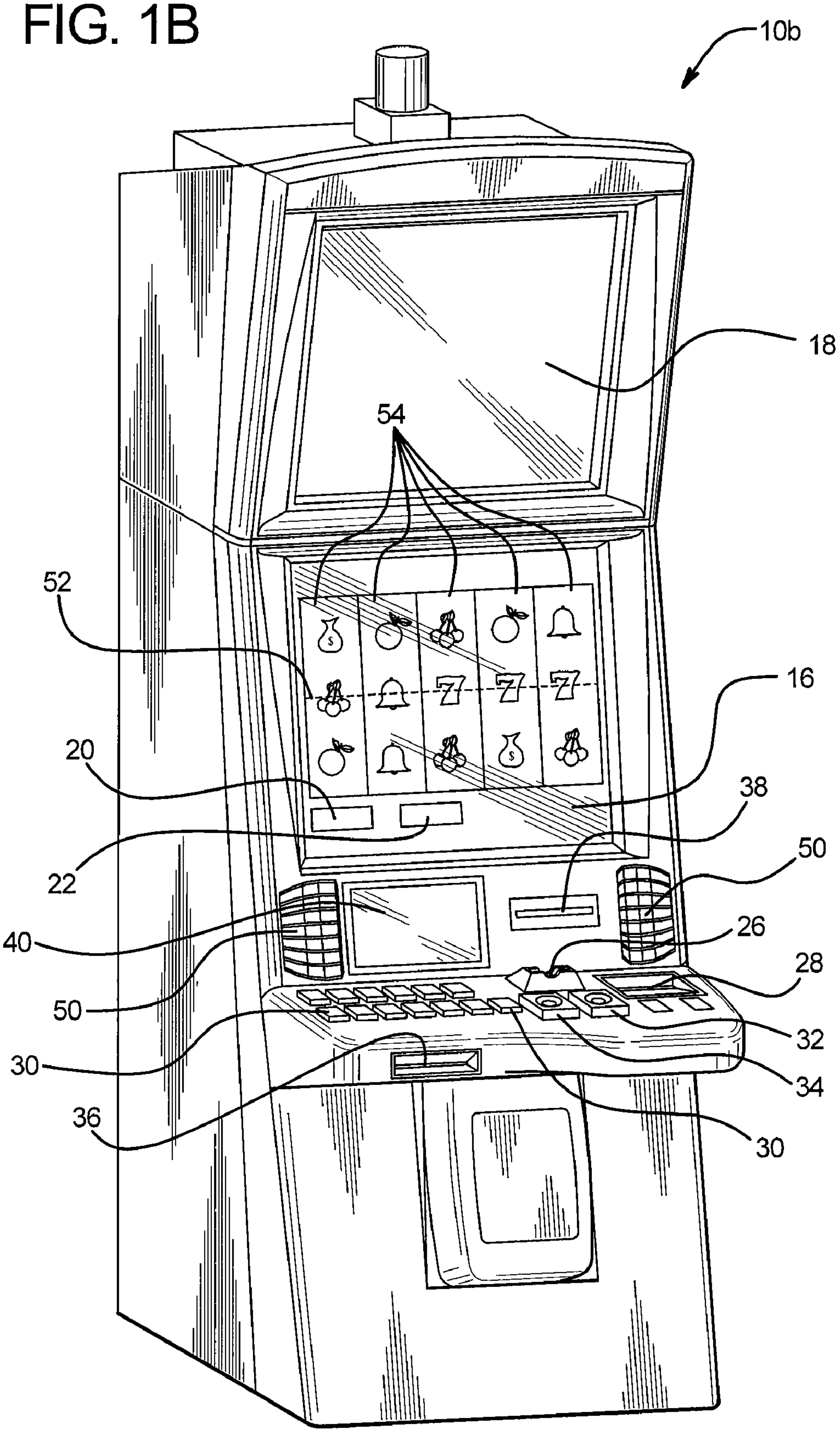

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
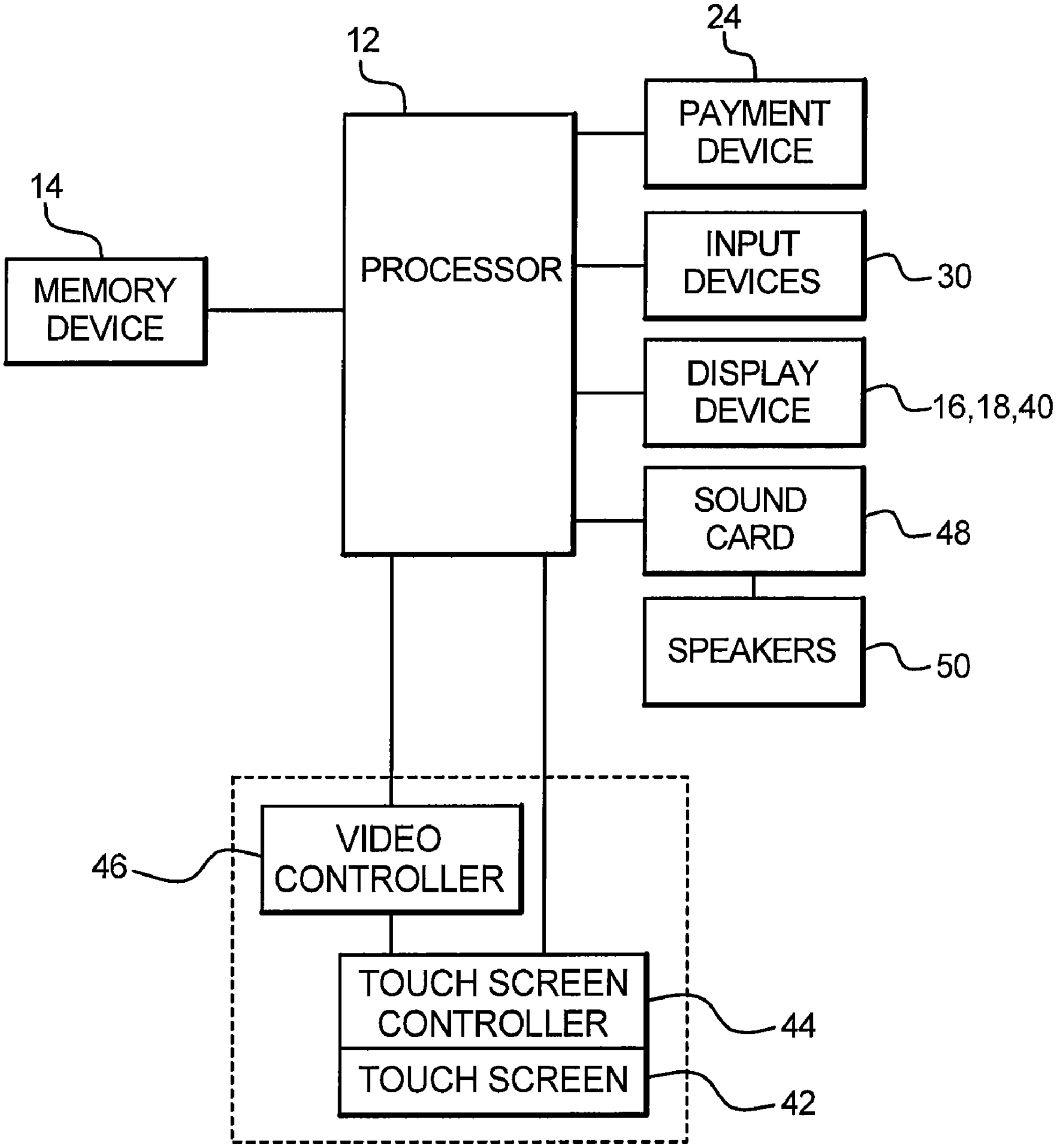
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
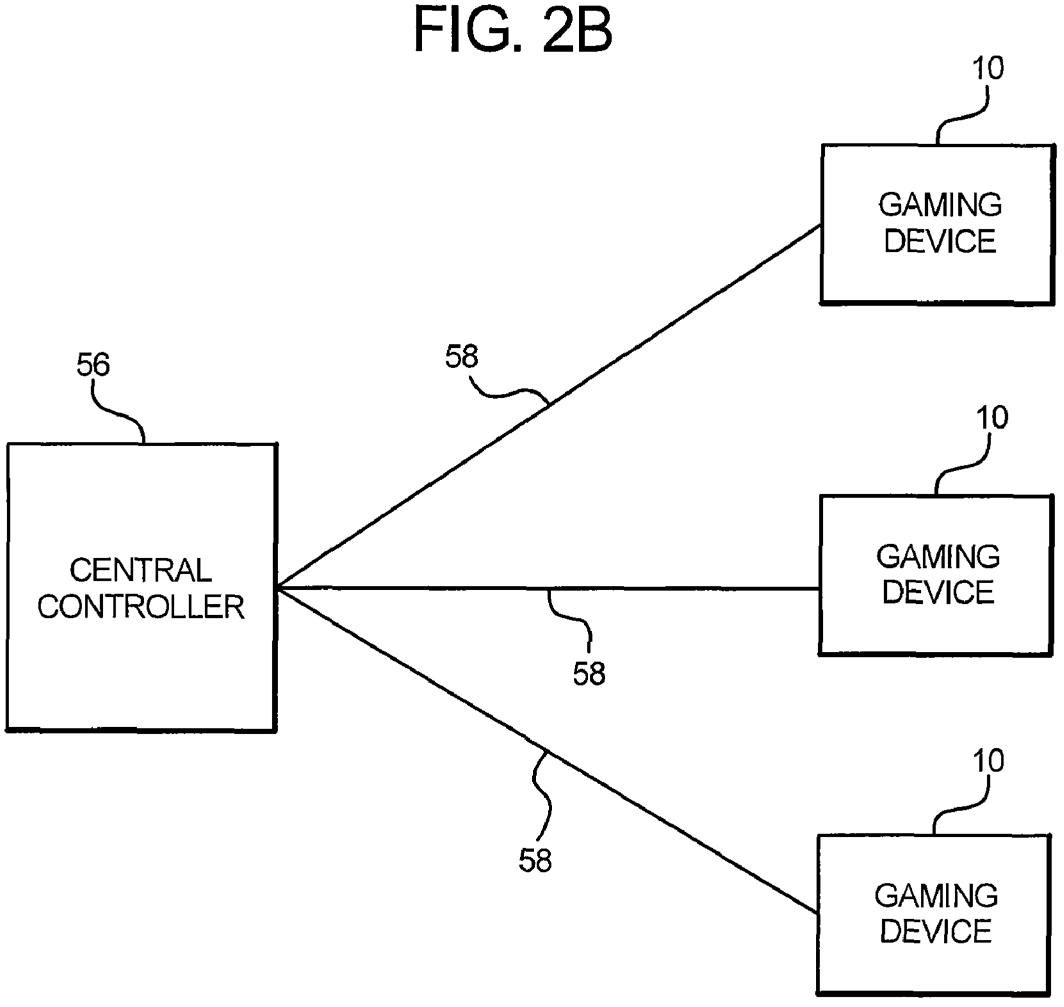
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device.

This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer.

In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of gaming devices in a gaming system participate in a group gaming environment wherein the players work in conjunction with one another (i.e., as a team or group) to win one or more awards. In one such embodiment, any award won by the group is shared, either equally or based on any suitable criteria, amongst the different players of the group.

Purchasable Bonus Event Evaluations

Figure 3:
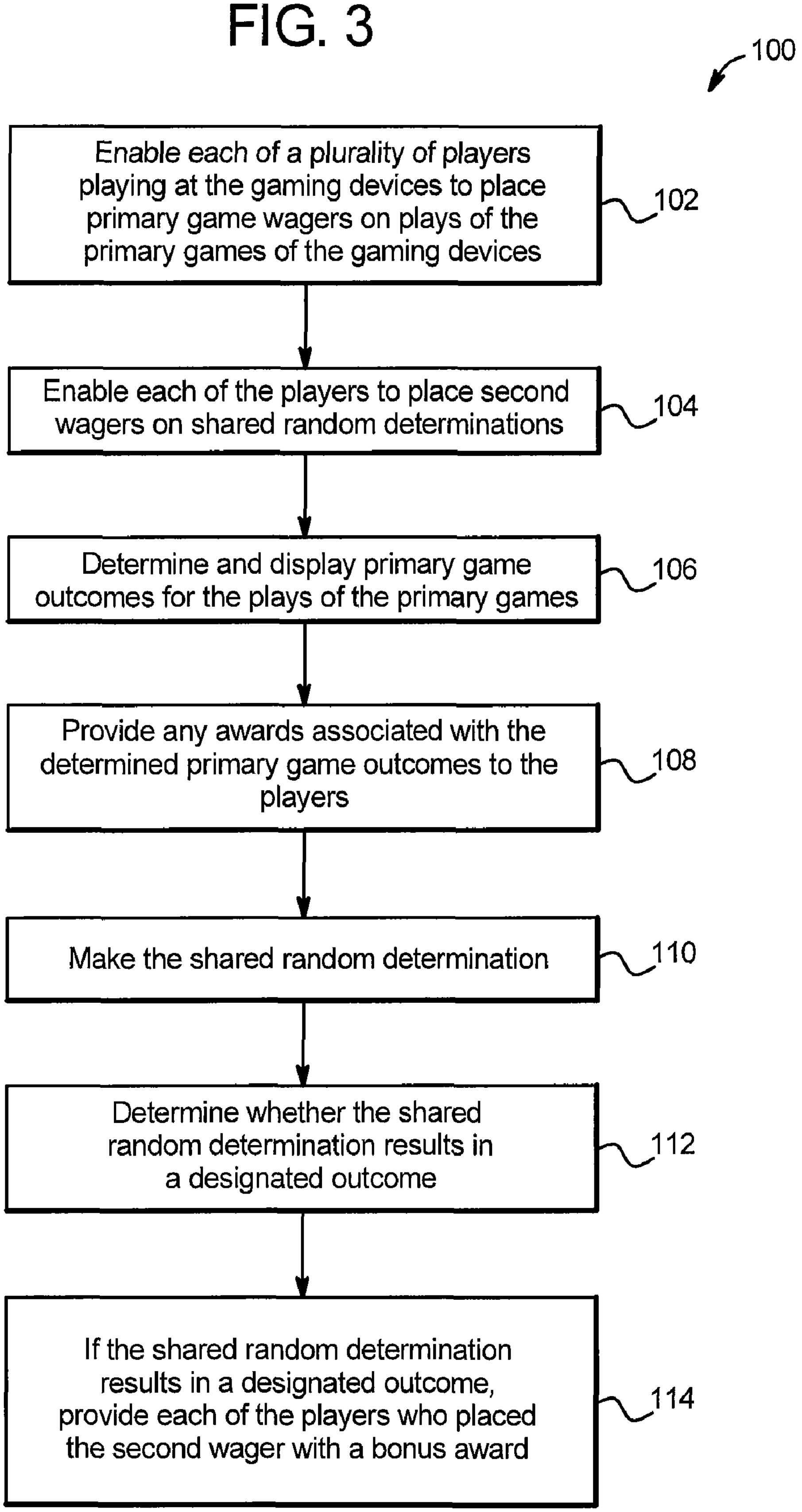
FIG. 3 is a flow chart illustrating one embodiment of the present disclosure.

Referring now to FIG. 3, one embodiment of the present disclosure operates according to sequence 100. In one embodiment, a gaming system includes a central server or controller in communication with or linked to a plurality of gaming machines or gaming devices. Another embodiment of the present disclosure provides a gaming system having a plurality of linked gaming machines where one of the gaming machines functions as the central server or controller. Each of the gaming devices includes at least one primary or base game operable upon a wager by a player. In some embodiments, each gaming device may have one or a plurality of different primary games. In certain embodiments, the primary games of each gaming device or a plurality of the gaming devices may be the same games or different games. In one embodiment, the gaming system further includes shared random determinations which occur independently of the primary games.

As indicated by block 102, the gaming system operates with the gaming devices to enable a plurality of players playing at the gaming devices to place primary game wagers on plays of the primary games. The gaming devices enable each of the players to place optional second wagers on shared random determinations, as indicated by block 104. Placing the second wagers on the shared random determinations enables players to become eligible to win bonus awards.

In one embodiment, the gaming system requires the players to place the second wagers with the primary game wagers. In other embodiments, the gaming system requires players to place the second wagers within a designated qualification period. For example, the controller determines which players have placed the second wagers in a five-second time period, and those players will be eligible to win bonus awards when the shared random determination is provided. In other embodiment, the gaming system provides the shared random determinations at predetermined time intervals, such as every second.

As indicated by block 106, the gaming system determines and displays primary game outcomes for the plays of the primary games. Any awards associated with the primary game outcomes are provided to the players, as indicated by block 108.

As indicated by block 110, the gaming system makes the shared random determination. As indicated by block 112, the gaming system determines whether the shared random determination results in a designated outcome. If the shared random determination results in a designated outcome, the gaming system provides each of the players who placed the separate second wager with a bonus award.

In various embodiments, the bonus awards may include any suitable types of awards including credits, gift certificates, additional bonus games, or physical awards such as mobile telephones. In certain embodiments, the bonus award includes any suitable event or activity which provides the players playing at the gaming devices of the gaming system with the chance to win a bonus award, as will be discussed in more detail below.

In one embodiment, if the shared random determination results in a designated outcome, each player who placed the second wager receives a bonus award. In another embodiment, less than all of the players who placed the second wager are provided with a bonus award if the shared random determination outcome is a designated outcome. In one embodiment, each player who wins a bonus award receives the same bonus award. In other embodiments, each or a plurality of the players receives a different award.

The bonus award that is provided to each player may be determined in any suitable manner. In one embodiment, an eligible player's bonus award is based on the player's wager level. That is, players who are wagering on the primary game in larger increments are provided with larger bonus awards. In various alternative embodiments, the size or amount of the bonus award provided to a player is randomly determined, predetermined, determined based on player status, or determined in any other suitable manner.

Referring now to FIGS. 4A, 4B, 4C, and 4D, in one embodiment, a plurality of adjacently arranged gaming devices are associated with a shared display. The example of FIGS. 4A to 4D demonstrates how players playing at a gaming system may purchase opportunities to win bonus awards in addition to primary game awards by placing separate second wagers.

Figure 4A:
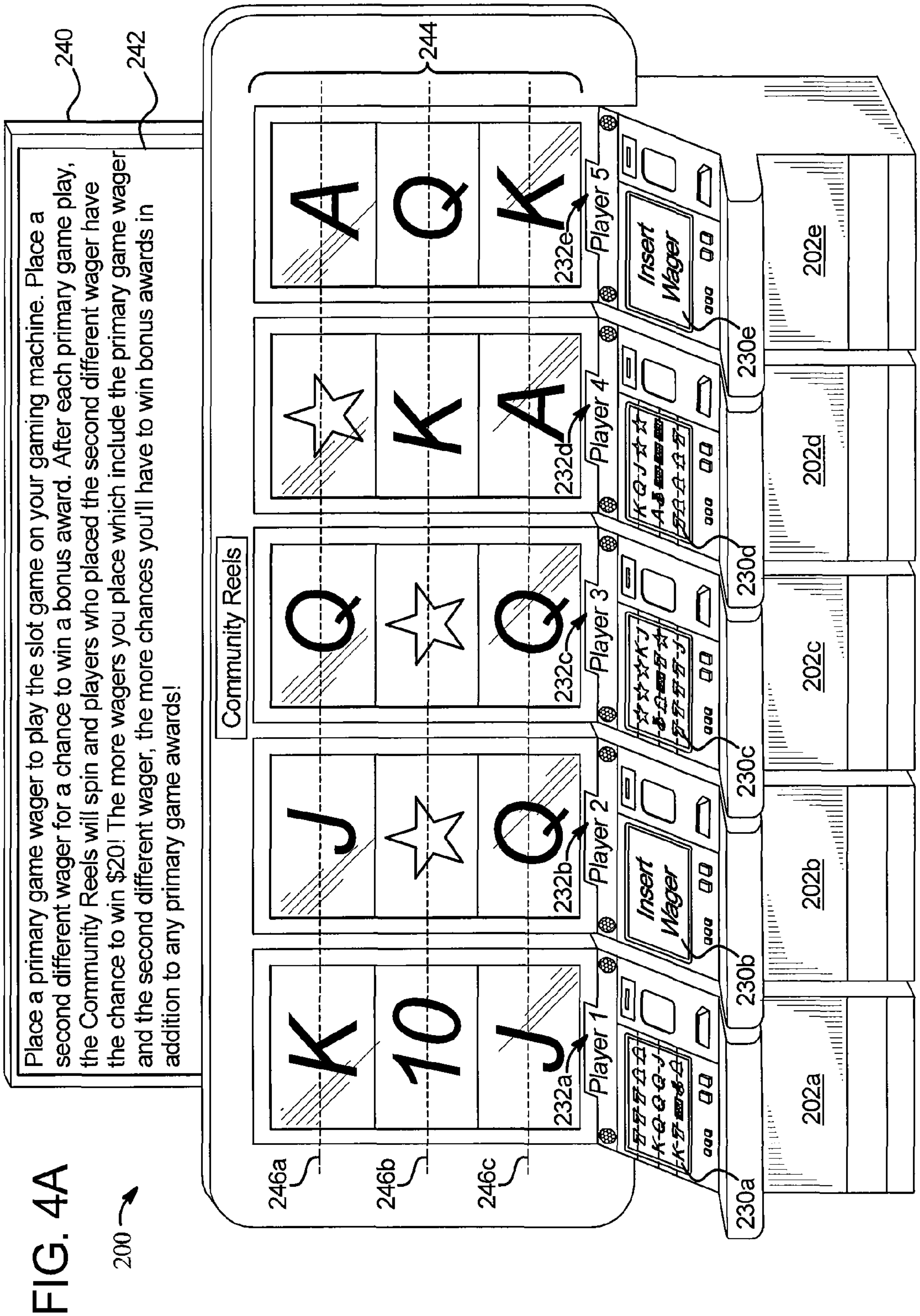
FIGS. 4A, 4B, 4C, and 4D are perspective views of one embodiment of the gaming system of the present disclosure including a plurality of gaming devices which enable a plurality of players to each place a second wager to purchase an opportunity to win a bonus award.

As seen in FIG. 4A, the gaming system 200 includes a plurality of gaming devices 202*a*, 202*b*, 202*c*, 202*d*, and 202*e*. Each of the gaming devices includes a primary game display device 230*a*, 230*b*, 230*c*, 230*d*, and 230*e* that displays a primary game. The gaming devices 202*a*, 202*b*, 202*c*, 202*d*, and 202*e* are associated with a shared display 240. The shared display 240 includes a set of community reels 244. The shared display 240 further includes a message window 242 for providing the players information and instructions regarding game play.

For ease of illustration, the shared display of this example provides information about what is occurring during the plays of the primary games, such as which players win awards for achieving designated winning combinations of symbols on the reels. It should be appreciated, however, that in certain embodiments, the shared display does not display information regarding primary game play and/or the players' performance in the primary game. Further, in this example, the shared random determinations are displayed to the players on the shared display. In other embodiments, the shared random determinations are not displayed to the players. In such embodiments, the shared random determinations occur behind the scenes. If the shared random determination results in a designated outcome, the gaming system provides a bonus award or bonus event which is displayed to the players.

As illustrated in FIG. 4A, three of the gaming devices 202*a*, 202*c*, and 202*d* are being played by players 232*a*, 232*c*, and 232*d*. The message window 242 of the shared display 240 includes a message prompting the players to place a primary game wager to play the slot games of their respective gaming machines. The message informs the players that they may place a second different wager for a chance to win a bonus award. Player 1, Player 3, and Player 4 232*a*, 232*c*, and 232*d* playing at gaming devices 202*a*, 202*c*, and 202*d*, respectively, have each placed the second wager in addition to the primary game wager. Thus, Player 1, Player 3, and Player 4 232*a*, 232*c*, and 232*d* each have the chance to win a bonus award in addition to their existing chance of winning awards in the primary game.

Figure 4B:
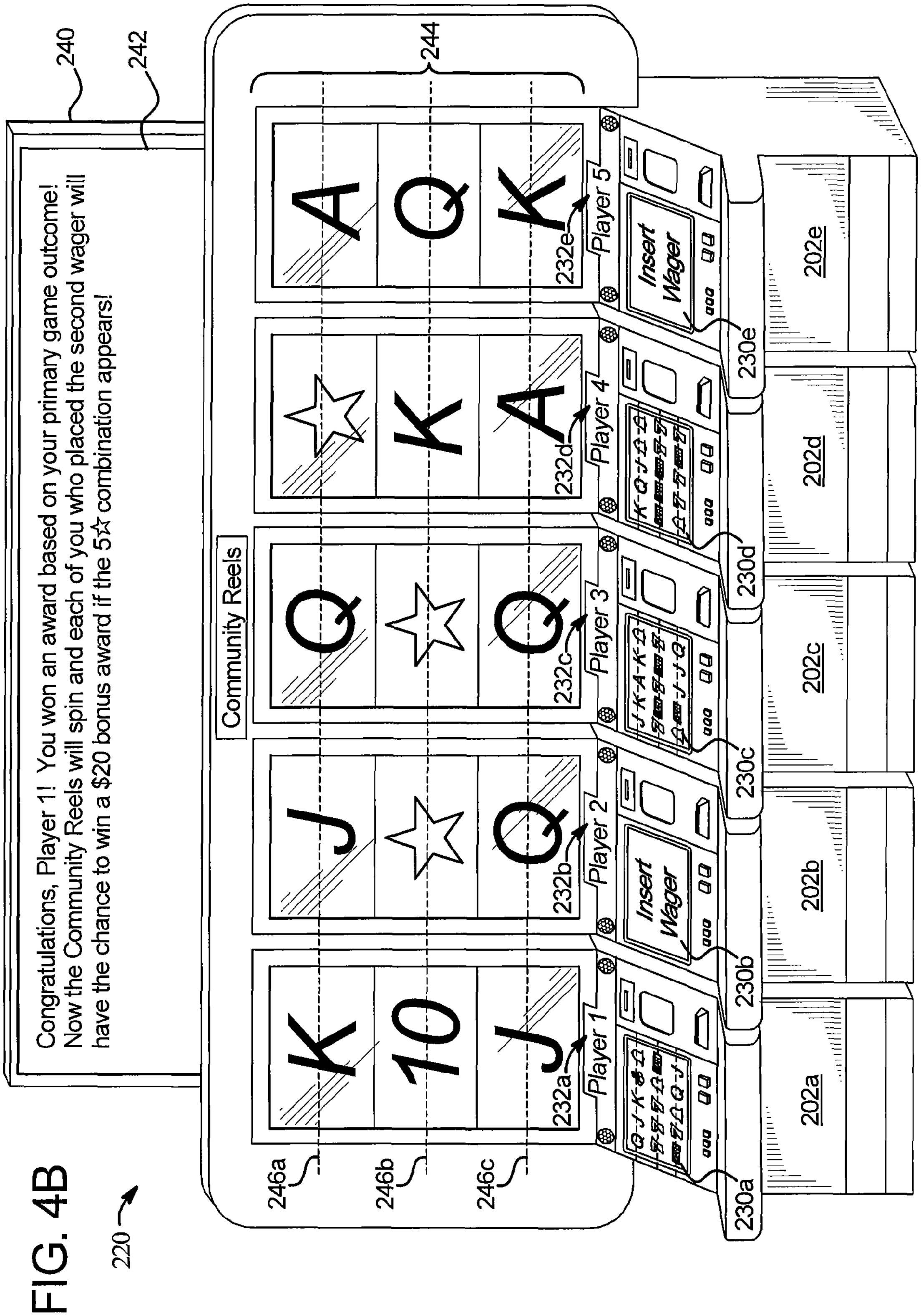

As illustrated in FIG. 4B, Player 1 232, who is playing at gaming device 202*a*, obtains a winning combination of symbols in the play of the primary game. Accordingly, the message window 242 displays a message congratulating Player 1 232*a* for winning an award in the primary game. The message also informs the players that the community reels 244 will spin for the shared random determination. In this example, if a combination including five "star" symbols is generated on the middle payline 246*b* associated with the community reels 244, each of the players who placed the second wager will have the chance to win the $20 bonus award.

Figure 4C:
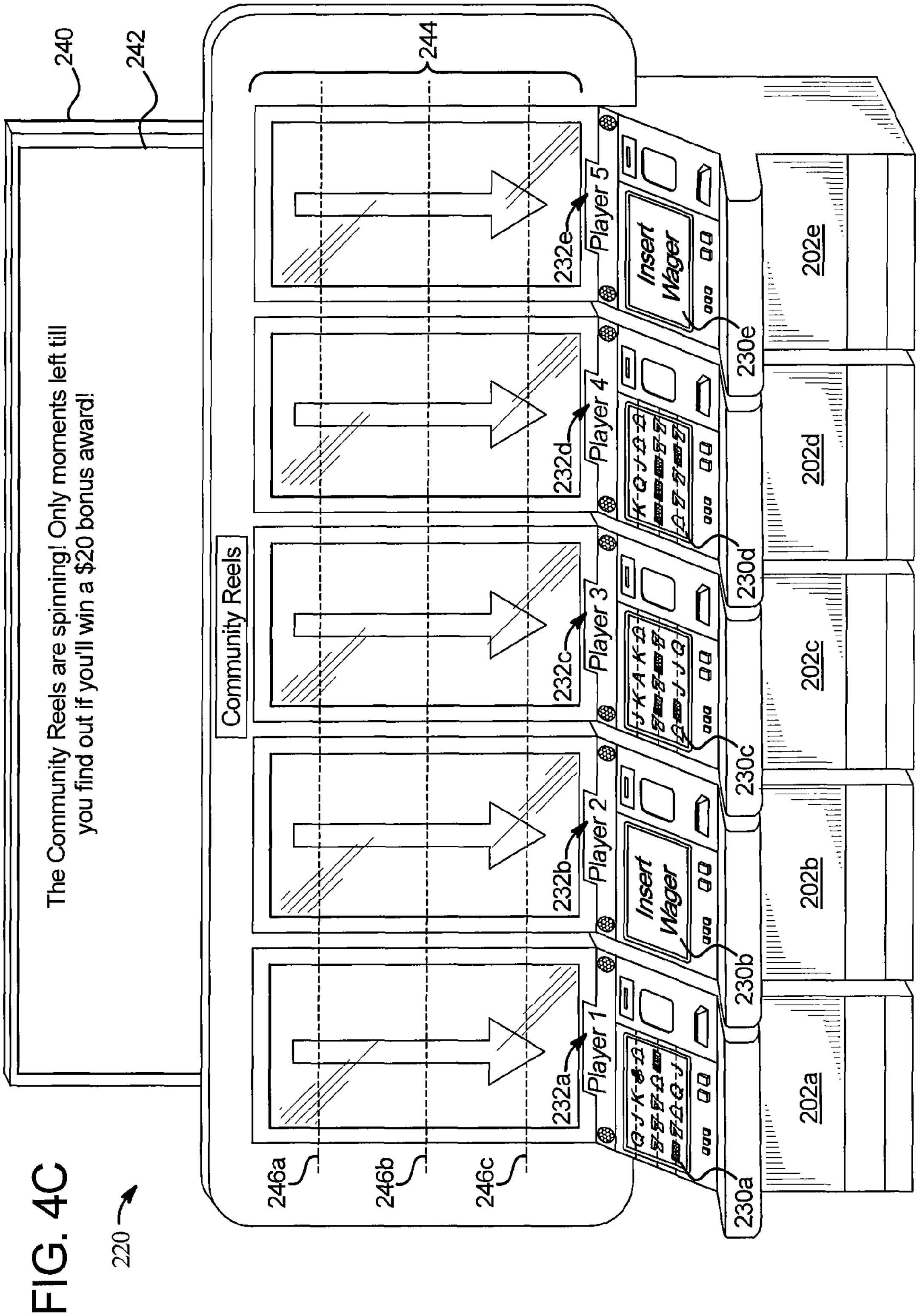

As illustrated in FIG. 4C, the community reels spin to randomly generate a plurality of symbols on the community reels 244. When the reels stop spinning, the gaming system evaluates the symbols generated on the community reels 244. If the designated outcome including five star symbols is indicated on the middle payline 246*b*, Player 1, Player 3, and Player 4 232*a*, 232*c*, and 232*d* will each be provided with a bonus award of $20, since they each placed the second wager. The message window 242 displays a message indicating to the players that there are only moments left before the players find out if they win a bonus award.

Figure 4D:
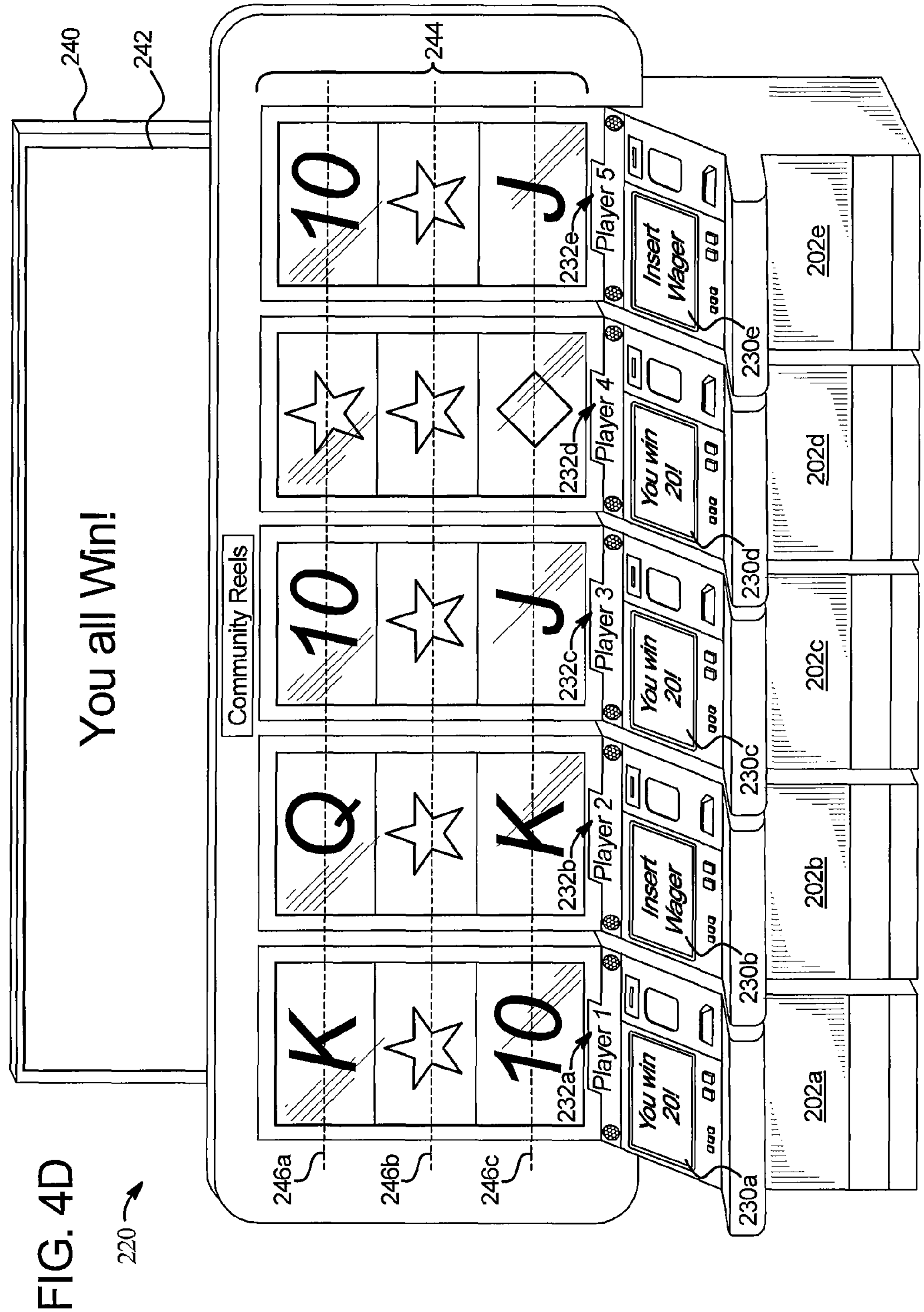

As seen in FIG. 4D, the community reels 244 have stopped spinning and a combination including five star symbols is indicated on the middle payline 246*b*. This symbol combination is the designated outcome. Accordingly, the gaming system provides each of the players who placed the second wager with the $20 bonus award. That is, Player 1, Player 3, and Player 4 232*a*, 232*c*, and 232*d* each win an award of $20, as indicated by the message displayed in the message window 242.

In one embodiment, the gaming system of the present disclosure enables players to place the second wagers to purchase opportunities to participate in a group bonus game. In this embodiment, if the outcome of one of the shared random determinations includes a designated outcome, the gaming system enables each of the players who placed the second wager (i.e., purchased a bonus opportunity) to participate in the group bonus game. In various embodiments, the group bonus game may be any suitable type of game, including but not limited to a slot, poker, blackjack, keno, or bingo game, a digit game, an auction, a trading game, a bidding game, or a competition game. In one such embodiment, each of the players who participates in the bonus game wins an award. In another embodiment, less than all of the players who participate in the bonus game win the award. The bonus game may be implemented and displayed to the players in any suitable manner.

Referring now to FIGS. 5A, 5B, 5C, 5D, 5E, and 5F one example embodiment of the present disclosure provides a plurality of adjacently arranged gaming devices in communication with a shared display device. In this example, if the shared random determination results in a designated outcome, the gaming system enables one or more of the players to play a group bonus game which is displayed for all the players to see on the shared display device.

Figure 5A:
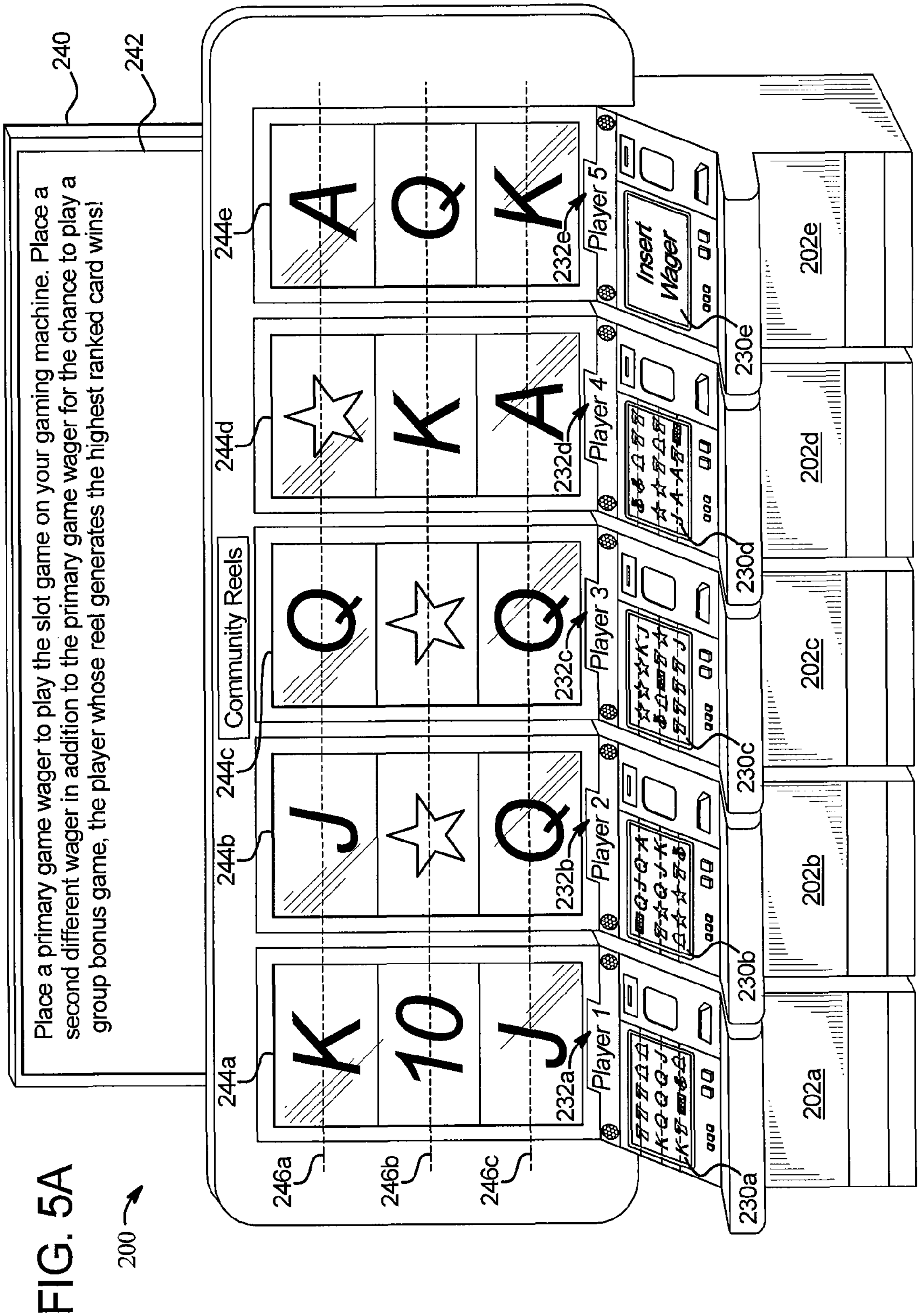
FIGS. 5A, 5B, 5C, 5D, 5E, and 5F are perspective views of one embodiment of the gaming system of the present disclosure including a plurality of gaming devices which enable a plurality of players to each place a second wager to purchase an opportunity to participate in a group bonus game.

As seen in FIG. 5A, each of the gaming devices 202*a*, 202*b*, 202*c*, 202*d*, and 202*e* of the gaming system 200 includes a primary game display device 230*a*, 230*b*, 230*c*, 230*c*, 230*d*, and 230*e* which displays a primary game. In the illustrated embodiment, the primary game is a slot game. The gaming devices 202*a*, 202*b*, 202*c*, 202*d*, and 202*e* are associated with a shared display 240. The shared display 240 includes a set of community reels 244, which includes a plurality of reels. The shared display 240 further includes a message window 242 for providing the players information and instructions regarding game play. In this example, the shared random determination is displayed to the players on the shared display.

In the example of FIGS. 5A to 5F, the group bonus game is displayed to the players on the shared display. It should be appreciated, however, that the group bonus game may be implemented and displayed to the players in any suitable manner. In different embodiments the group bonus game may be provided to the players on a shared display associated with the gaming system or on a display device of each participating player's gaming device. In one embodiment, the group bonus game is displayed on a display device of each participating player's gaming device in addition to being displayed on a shared display.

As illustrated in FIG. 5A, each of the five gaming devices 202*a*, 202*b*, 202*c*, 202*d*, and 202*e* are being played by a player. The message window 242 of the shared display 240 includes a message prompting the players to place primary game wagers to play the slot games of their respective gaming machines. The message also indicates to the players that, by placing a second different wager in addition to the primary game wager, the players may purchase the chance to participate in the group bonus game. In this example, the group bonus game includes a spin of the community reels 244. Each of the gaming devices 202*a*, 202*b*, 202*c*, 202*d*, 202*e* is associated with one of the community reels 244. More specifically, in this example, each of the gaming devices 202*a*, 202*b*, 202*c*, 202*d*, 202*e* is associated with the community reel directly above that gaming device. For example, gaming device 202*a* is associated with community reel 244*a* and the gaming device 202*b* is associated with community reels 244*b*. In the group bonus game, after the community reels 244 spin, the player whose gaming device is associated with the community reel displaying the symbol with the highest rank on the middle payline 246*b* wins the group bonus game and is provided with an award.

In this example, Player 1, Player 3, Player 4, and Player 5 232*a*, 232*c*, 232*d*, and 232*e* playing at gaming devices 202*a*, 202*c*, 202*d*, and 202*e*, respectively, have each placed the second wager in addition to the primary game wager. Player 2 232*b* has chosen not to place the second wager, and thus, will not be eligible to participate in the group bonus game if the determination is made to provide the group bonus game.

Figure 5B:
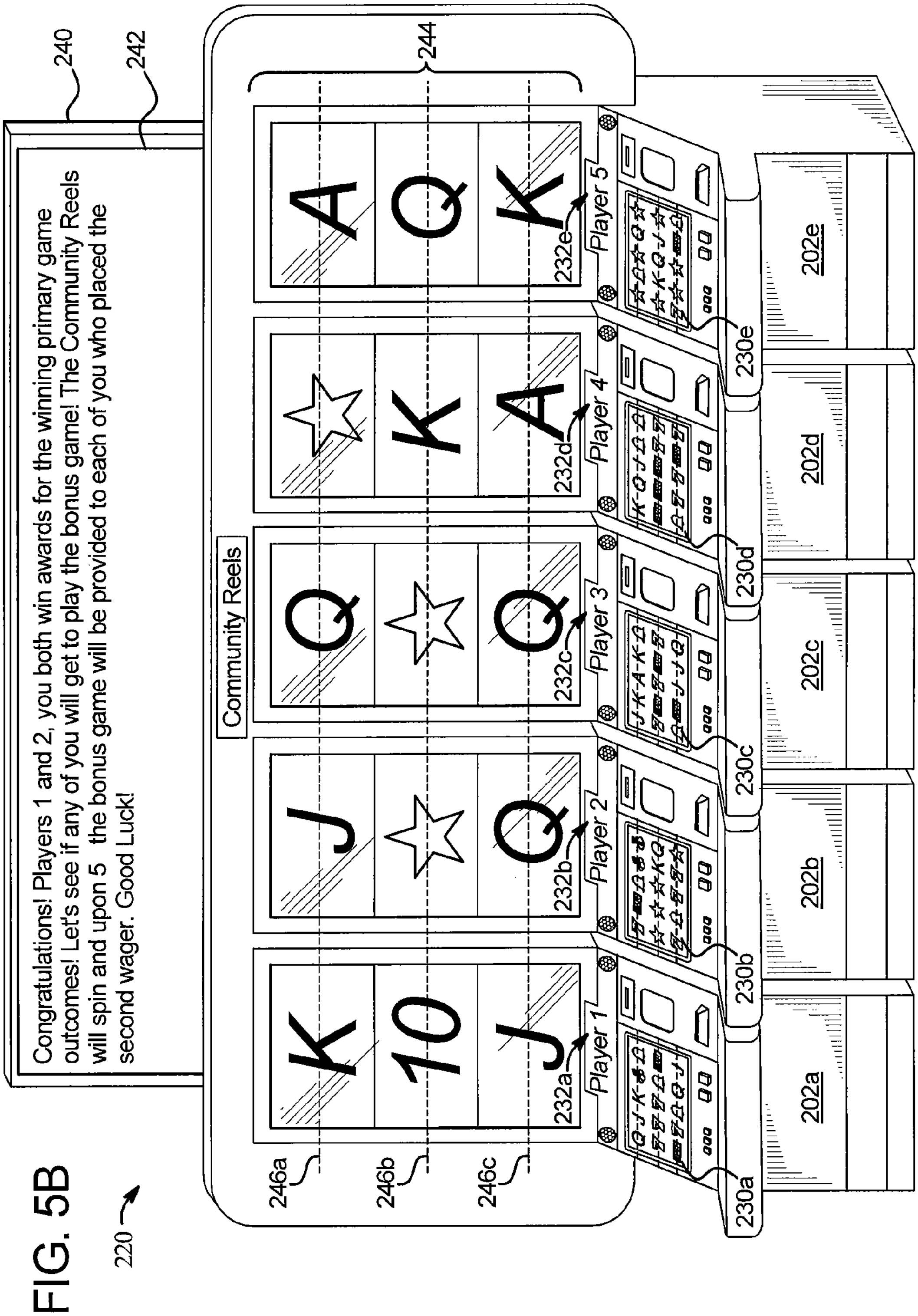

As illustrated in FIG. 5B, on gaming devices 202*a* and 202*b*, which are being played by Player 1 232*a* and Player 2 232*b*, respectively, winning combinations of symbols have occurred in the primary game play. Accordingly, the message window 242 displays a message congratulating Player 1 232*a* and Player 2 232*b* for winning awards in the primary game. The message window 242 further indicates that the community reels 244 will spin for the shared random determination. In this example, if a combination including five "star" symbols is generated on the middle payline 246*b* associated with the community reels 244, each of the players who placed the second wager will participate in the group bonus game.

Figure 5C:
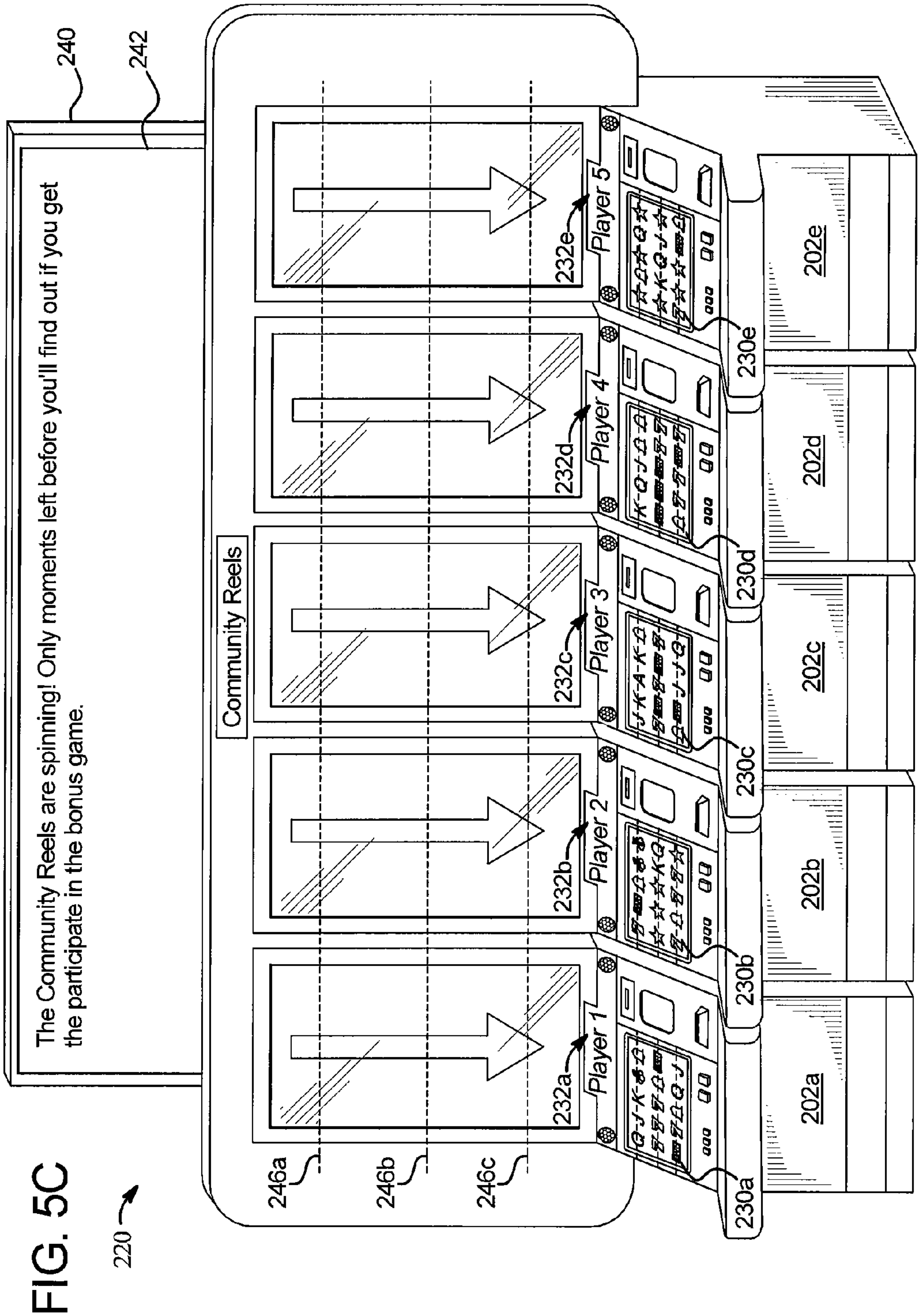

As seen in FIG. 5C, the community reels 244 spin to randomly generate a plurality of symbols on the reels. The message window 242 displays a message indicating to the players that there are only moments left before the players find out if they will play the bonus game or not.

Figure 5D:
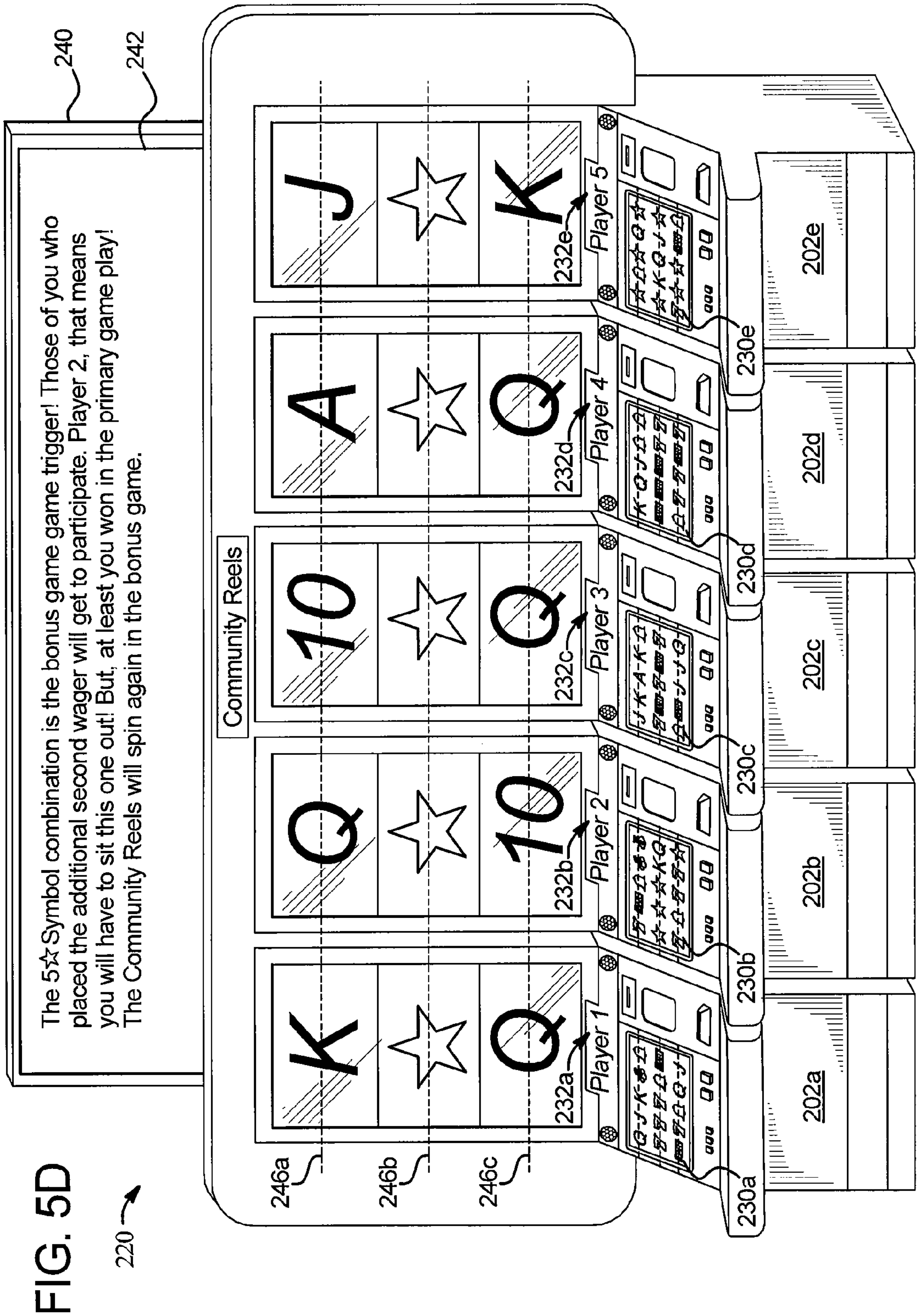

As illustrated in FIG. 5D, the community reels 244 have stopped spinning and five star symbol are indicated along the middle payline 246*b*. Accordingly, the gaming system determines which of the players placed the second wager and enables each of those players to participate in the group bonus game in attempt to win a bonus award of $50. Since Player 2 232*b* did not place the second wager, Player 2 232*b* will not have the opportunity to compete for the $50 bonus award.

Figure 5E:
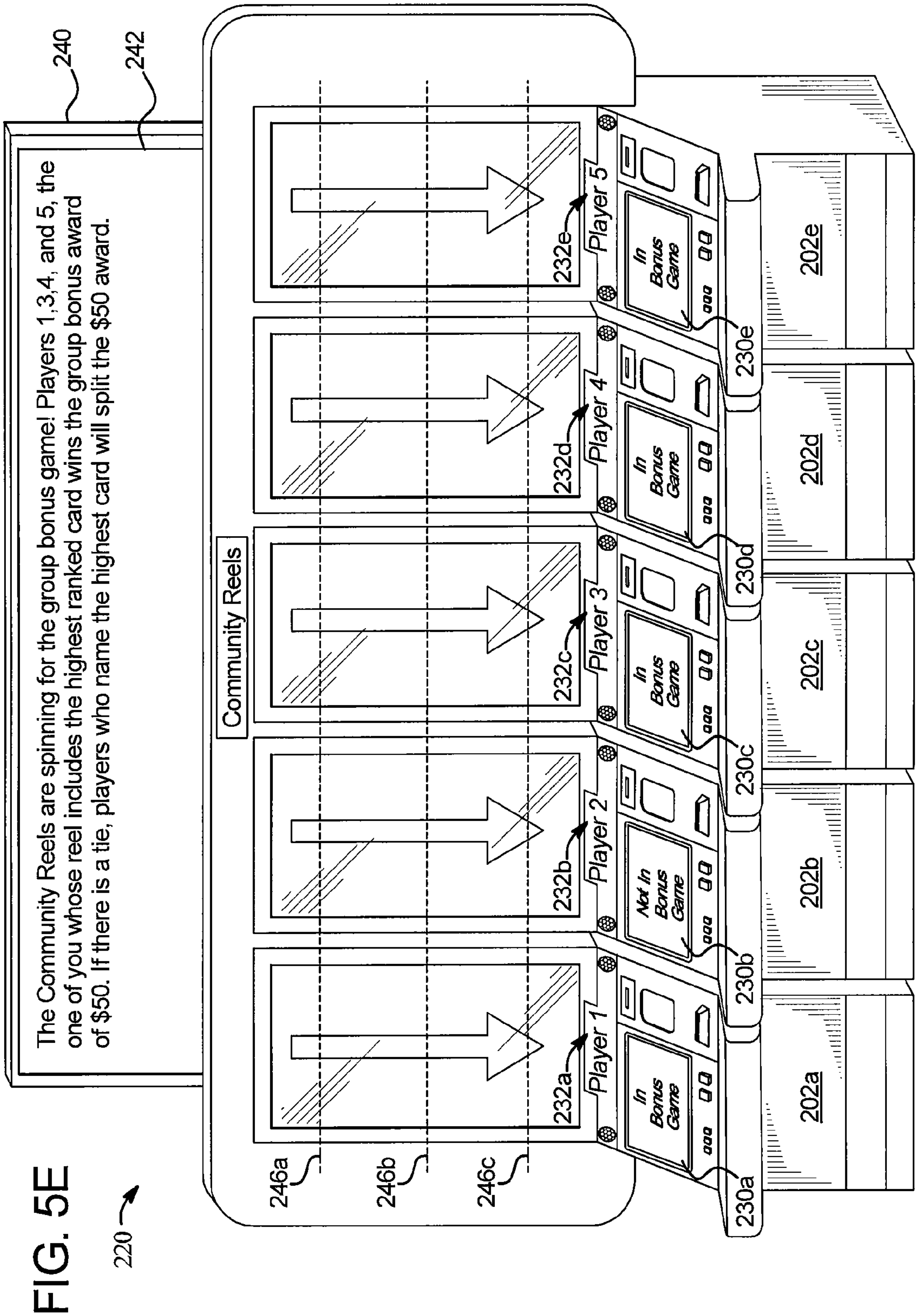

As seen in FIG. 5E, the community reels 244 are spinning in the group bonus game. The primary game display devices 230*a*, 230*b*, 230*c*, 230*d*, and 230*e* of the gaming devices 202*a*, 202*b*, 202*c*, 202*d*, and 202*e* display information regarding each player's status with respect to the group bonus game. That is, the primary game display devices 230*a*, 230*b*, 230*c*, 230*d*, and 230*e* indicate that Player 1, Player 3, Player 4, and Player 5 232*a*, 232*c*, 232*d*, and 232*e* are participating in the bonus game and that Player 2 232*b* is not participating in the bonus game. Thus, Player 1, Player 3, Player 4, and Player 5 232*a*, 232*c*, 232*d*, and 232*e* each have the chance to win the $50 bonus award.

Figure 5F:
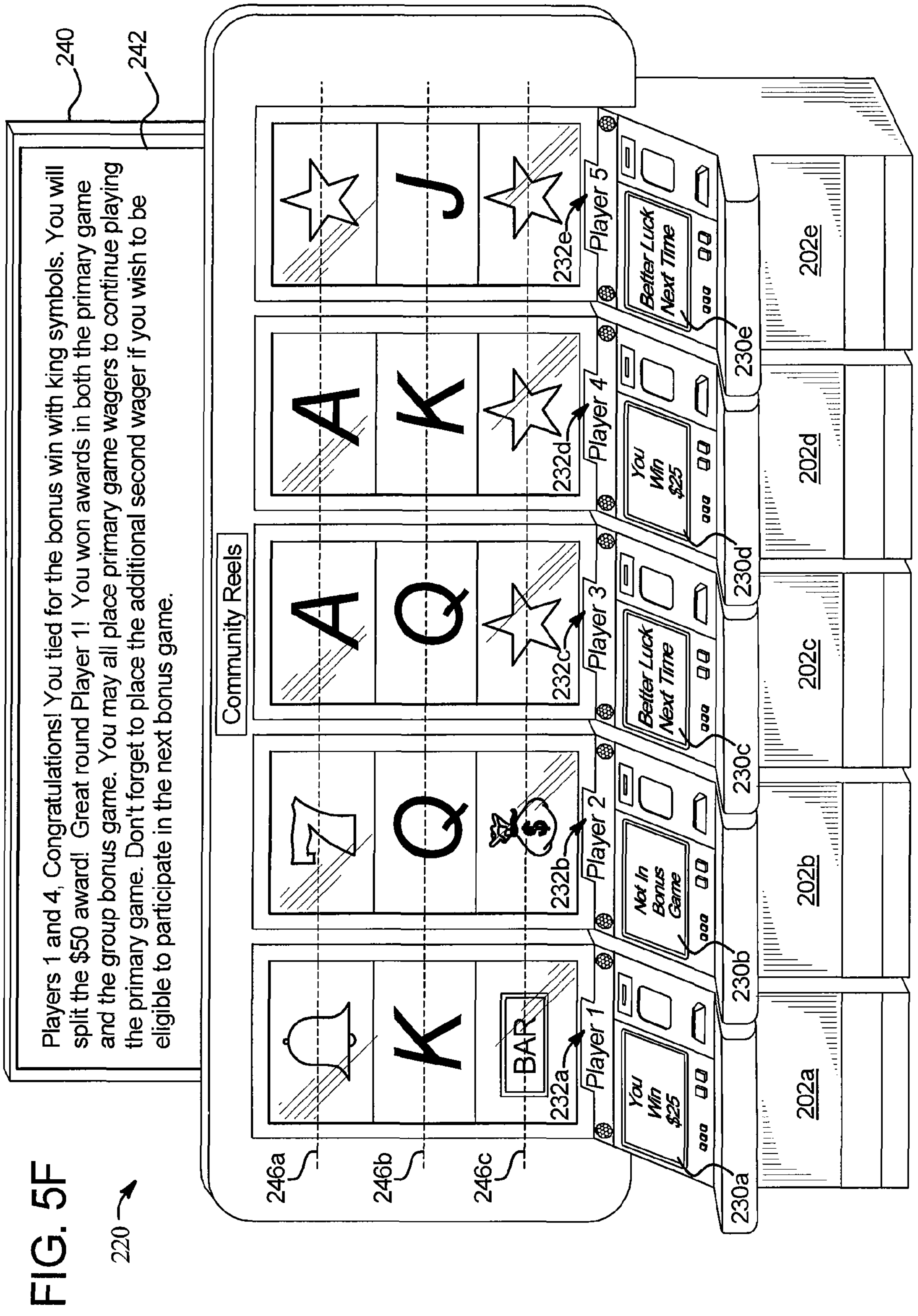

As illustrated in FIG. 5F, community reels 244*a* and 244*d* each indicate a "king" symbol on the middle payline 246*b*. The king symbols are the highest ranked of all the symbols indicated on the middle payline 246*b*. Accordingly, there is a tie between Player 1 232*a* and Player 4 232*d*, since Player 1 232*a* and Player 4 232*d* are playing at the gaming devices 202*a* and 202*d* which are associated with community reels 244*a* and 244*d*, respectively. As indicated by the message displayed in the message box 242, Player 1 232*a* and Player 4 232*d* will split the bonus award. The primary game display devices 230*a* and 230*d* indicate that Player 1 232*a* and Player 4 232*d* each receive a bonus award of $25, and the primary game display devices 230*c* and 230*e* display a message wishing Player 3 and Player 5 better luck next time.

In one embodiment, the gaming system enables each of the players playing at one of the gaming devices to place an optional second wager to purchase a plurality of opportunities to win one or more bonus awards. In one such embodiment, at any designated time, the gaming system enables each of the players to select one of a plurality of different predefined second wager amounts. Each of the predefined second wager amounts is associated with a different number of bonus opportunities. Each player selects the predefined second wager amount corresponding to the number of bonus opportunities that player wishes to purchase. For example, a player can choose to purchase 5 bonus opportunities by placing a second wager amount of $5, 10 bonus opportunities by placing a second wager amount of $10, or 20 bonus opportunities by placing a second wager amount of $20.

In one example, upon sitting down at the gaming device, the player deposits an amount of money, such as 100 dollars, into the gaming device. The credit meter displays the number of credits corresponding to the 100 dollars. The gaming system enables each player to purchase 1 opportunity for 1 dollar, 5 opportunities for 5 dollars, or 10 opportunities for 10 dollars. If the player chooses to pay the 10 dollars, the gaming device deducts 10 dollars from the 100 dollars on the credit meter of the gaming device. The gaming device enables the player to place wagers to cause plays of the primary game using the remaining 90 dollars on the credit meter. In certain embodiments, the gaming system offers discounts to the players for purchasing larger number of bonus opportunities. For example, 5 opportunities may cost a player $5, but 10 opportunities only cost the player $8.

As the players play their respective primary games, each time the gaming system provides a shared random determination which results in a designated outcome, the gaming system provides each of the players who has at least one bonus opportunity remaining with a bonus award. In such embodiments, the system enables players to purchase multiple bonus opportunities at the same time instead of requiring players to place the separate second wager each time a player wishes to be eligible to win a bonus award.

In one embodiment, the gaming system provides the shared random determinations at predetermined time intervals. For example, the gaming system provides a shared random determination once every minute, once every second, or once every 0.5 seconds. Each time one of the shared random determinations results in a designated outcome, the gaming system provides each of the players who has at least one bonus opportunity remaining with a bonus award.

It should be appreciated that the shared random determinations occur independently of the primary games. Therefore, as long as a player has bonus opportunities remaining (or time remaining during which the player is eligible to win a bonus award), that player can play the primary game at his or her own pace and still have the chance to win one or more bonus awards.

In one embodiment, if a player does not play long enough to use all of his or her purchased bonus opportunities, any remaining opportunities are stored, such as via player tracking, for the player to use at a later time. In another embodiment, if a player does not play long enough to use all of the bonus opportunities that player purchased, any remaining bonus opportunities are forfeited when that player stops playing at the gaming device. In various alternative embodiments, a player will be considered to have stopped playing when: (i) a designated amount of time has elapsed wherein the player has not placed a primary game wager to play the primary game, (ii) the player's rate of play drops below a designated level, (iii) when the credit meter is at zero for a designated amount of time, (iv) when the cash-out button has been pressed, or (iv) when any other suitable criteria is met.

In certain embodiments, gaming system causes the shared random determinations to occur regardless of whether or not players are playing the primary games of the gaming devices. In such embodiments, if the determination is made to provide a bonus award, the gaming system determines whether or not there is at least one player playing at one of the gaming devices who is eligible to receive the award. In one such embodiment, if there are no players playing at the gaming devices who are eligible to receive an award, the gaming system disregards the determination to provide a bonus award, and normal game play continues.

In one embodiment, the gaming system enables players to purchase additional bonus opportunities at any designated time. In such embodiments, the gaming system enables each player to continuously add on to the number of bonus opportunities that the player has remaining.

Figure 6A:
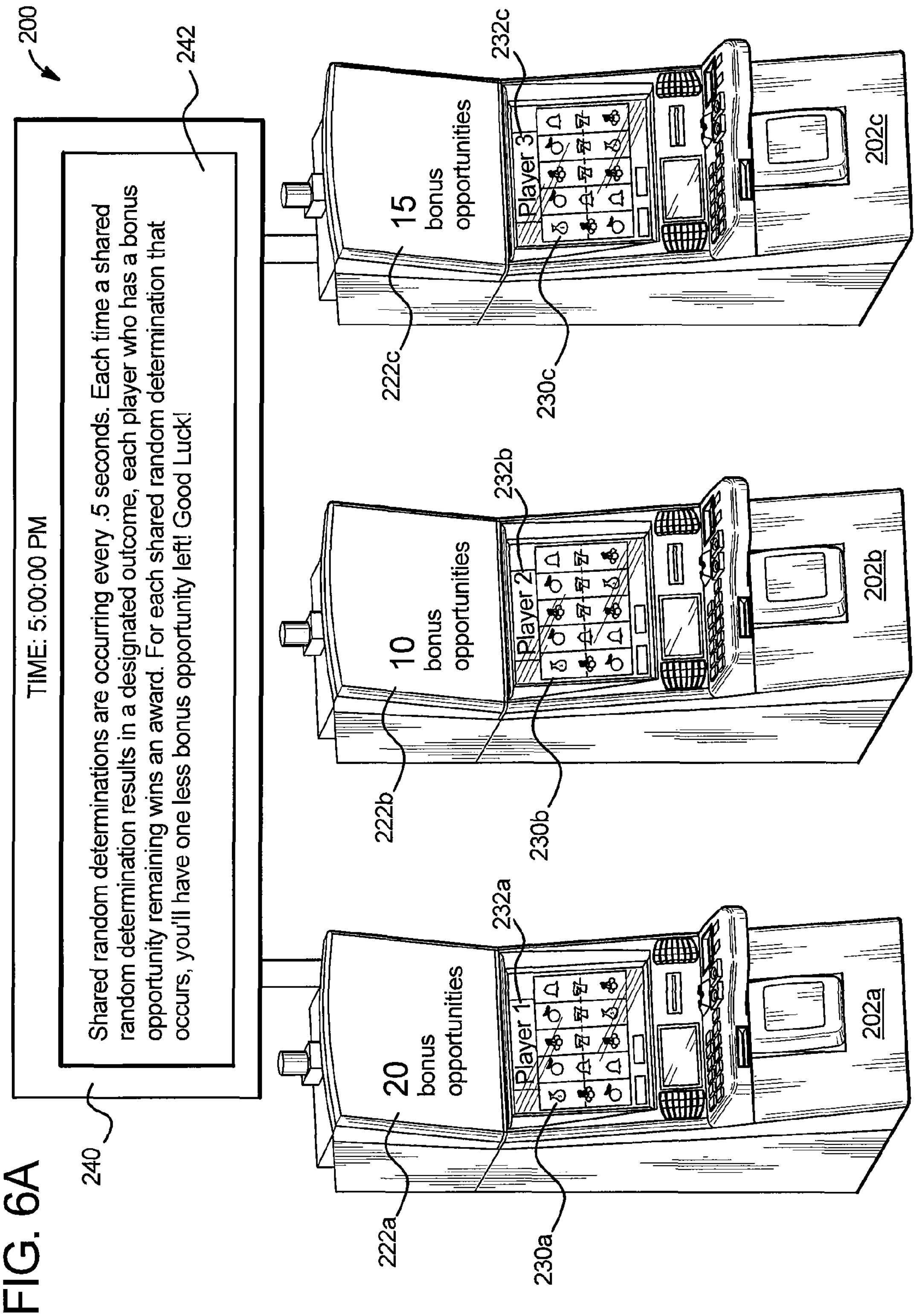
FIGS. 6A, 6B, and 6C are perspective views of one embodiment of the gaming system of the present disclosure including a plurality of gaming devices which enable a plurality of players to each purchase a plurality of bonus opportunities.
Figure 6B:
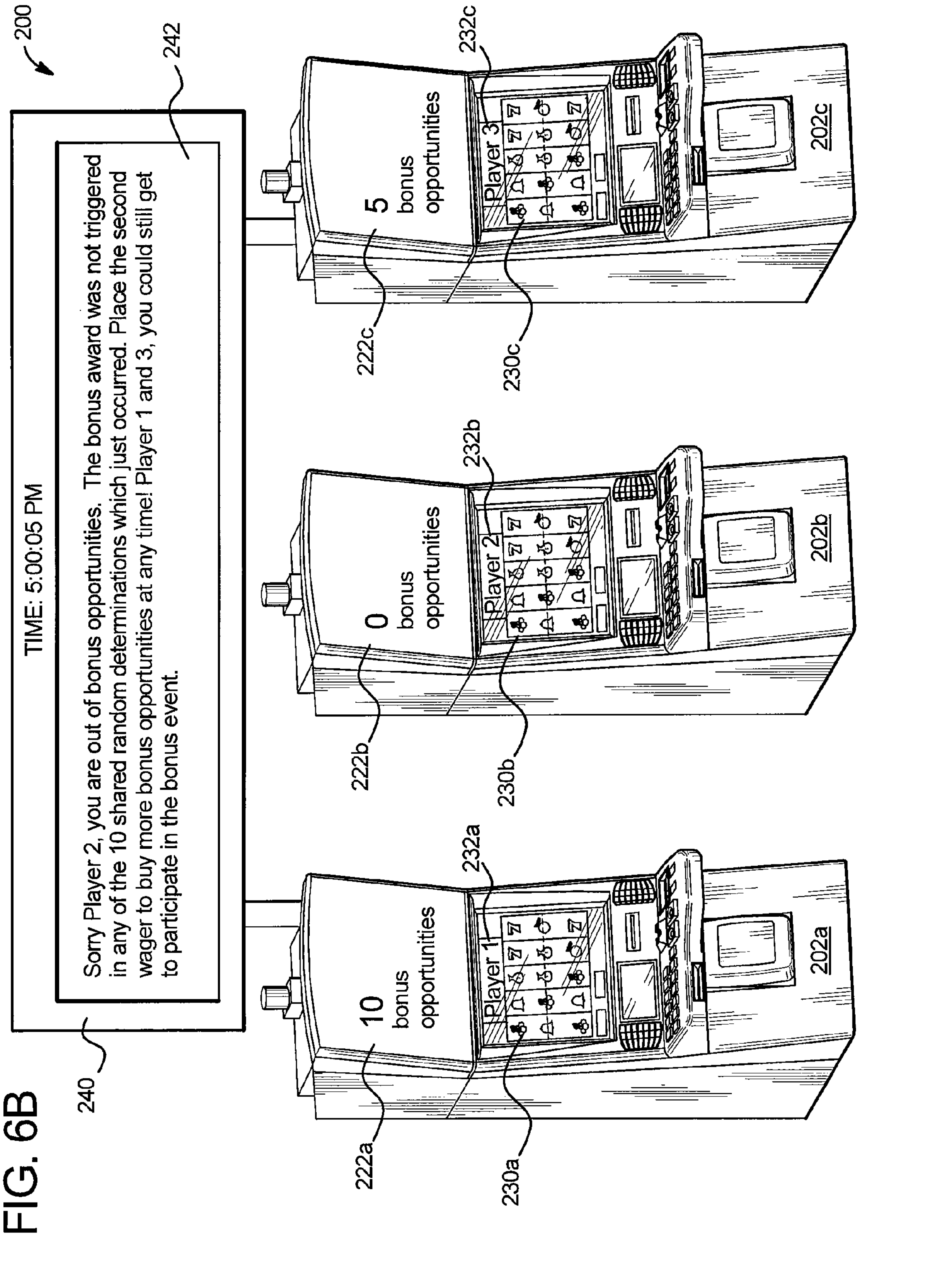
Figure 6C:
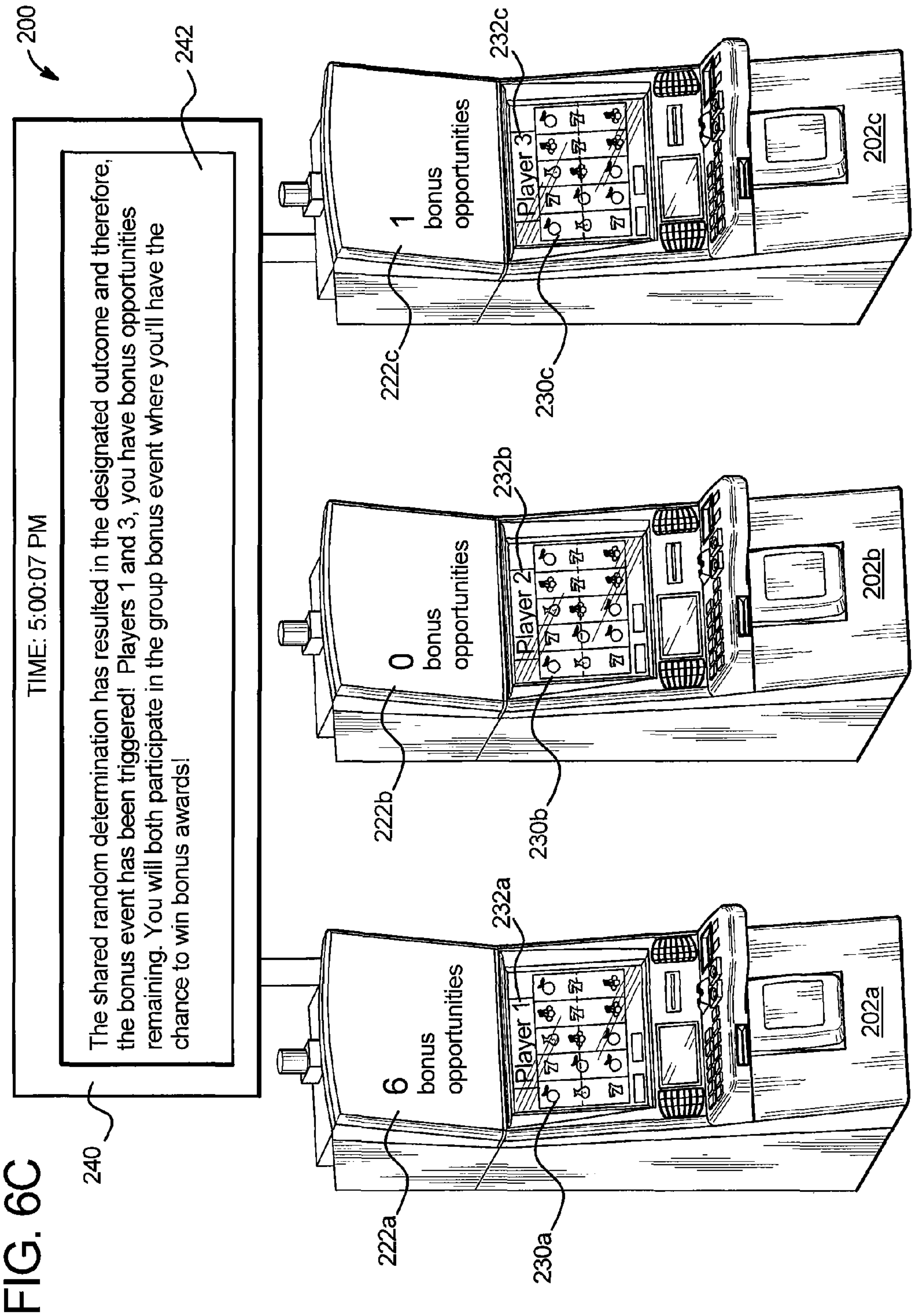

Referring now to FIGS. 6A, 6B, and 6C, in one embodiment, the number of opportunities that each player has at any designated time is displayed to the player. As the gaming system provides the random determinations, the number of bonus opportunities remaining for each player decrements.

As illustrated in FIG. 6A, the gaming devices 202*a*, 202*b* and 202*c* are currently being played by three players 232*a*, 232*b*, and 232*c*. The gaming devices 202*a*, 202*b* and 202*c* are associated with a shared display 240 configured to display a group bonus event. The shared display 240 further includes a message window 242 for providing the players information and instructions regarding game play. In this example, the shared random determinations are not displayed to the players. Rather, the gaming system causes the shared random determinations to occur behind the scenes.

The gaming system enables the players to purchase a plurality of bonus opportunities. As indicated by the message in the message window 242, shared random determinations occur every 0.5 seconds to determine whether the bonus event will be triggered. For each of the shared random determinations which results in a designated outcome, the gaming system determines which of the players, if any, have at least one bonus opportunity remaining. If any of the players have bonus opportunities remaining, the gaming system enables those players to participate in the group bonus event. For each shared random determination that occurs, the number of bonus opportunities that each player has decrements by one. Thus, each purchased bonus opportunity represents a chance to participate in the group bonus event.

As illustrated in FIG. 6A, the time is exactly 5 o'clock PM. At this moment, Player 1 232*a* has 20 bonus opportunities, Player 2 232*b* has 10 bonus opportunities, and Player 3 232*c* has 15 bonus opportunities. In one embodiment, the gaming system requires the players to purchase the bonus opportunities with plays of the primary game. In other embodiments, the bonus opportunities can be purchased separately. In this example, the number of bonus opportunities that each of the player has left is displayed to the player on a secondary display device 222*a*, 222*b*, and 222*c* of each gaming device 202*a*, 202*b*, and 202*c*. It should be appreciated that the number of bonus opportunities that each player has remaining may be displayed to the player in any suitable manner. The primary games of the gaming devices are displayed to the players on the primary game display devices 230*a*, 230*b* and 230*c*.

As seen in FIG. 6B, 5 seconds have elapsed and, therefore, 10 shared random determinations have occurred (i.e., 2 shared random determinations occur per second). Since Player 2 232*b* only purchased 10 bonus opportunities, Player 2 232*b* has no opportunities remaining at this time, as indicated by the secondary display device 222*b* of the gaming device 202*b*. Thus, if Player 2 232*b* wishes to remain eligible to participate in the bonus event, Player 2 232*b* will need to purchase additional bonus opportunities, as indicated by the message in the message window 242. Player 1 232*a* has 10 bonus opportunities remaining, and Player 3 232*c* has 5 bonus opportunities remaining, as indicated by secondary display devices 222*a* and 222*c*, respectively.

In FIG. 6C, two more seconds have elapsed and, therefore, 4 more shared random determinations have occurred. The most recent shared random determination resulted in the designated outcome, as indicated by the message displayed in message window 242. Accordingly, the group bonus event has been triggered. At this time, Player 1 232*a* has 6 bonus opportunities remaining, and Player 3 232*c* has 1 bonus opportunity remaining, as indicated by secondary display devices 222*a* and 222*c*, respectively. Thus, the gaming system will enable Player 1 232*a* and Player 3 232*c* to participate in the group bonus event.

In another embodiment, rather than displaying to each player the number of opportunities that player has remaining, an amount of time during which the player may qualify for the bonus award or event is displayed to the player. For example, if a player purchases 20 bonus opportunities, and the gaming system causes the shared random determination to occur two times per second, the player has ten seconds to win one or more bonus awards. During that ten-second time period, for each shared random determination that results in a designated outcome, the gaming system provides a bonus award to the player. In other embodiments, the number of opportunities that a player has remaining and the amount of time during which that player may win a bonus award is displayed to each player.

Figure 7A:
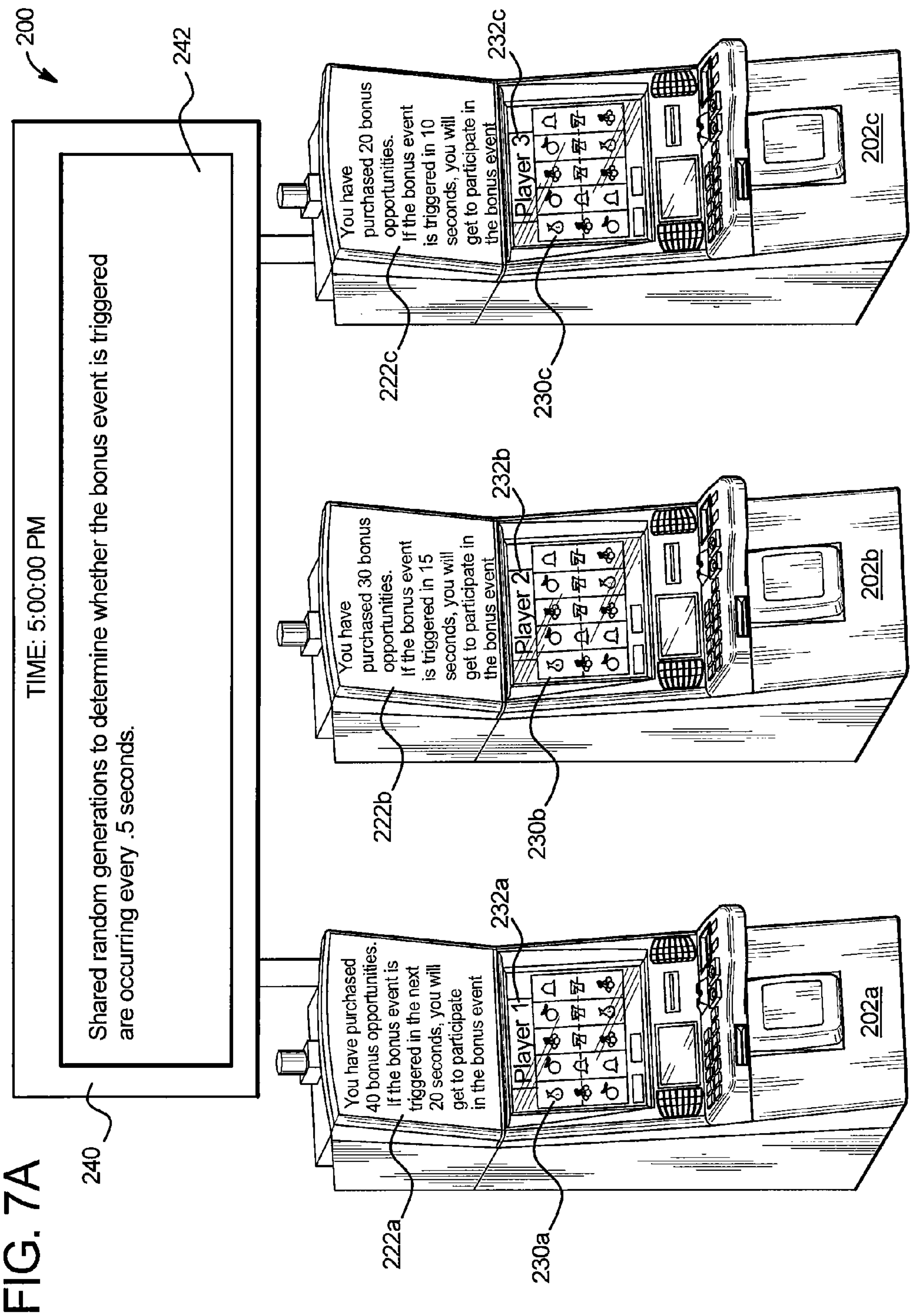
FIGS. 7A and 7B are perspective views of one embodiment of the gaming system of the present disclosure including a plurality of gaming devices which enable a plurality of players to each purchase a plurality of bonus opportunities.
Figure 7B:
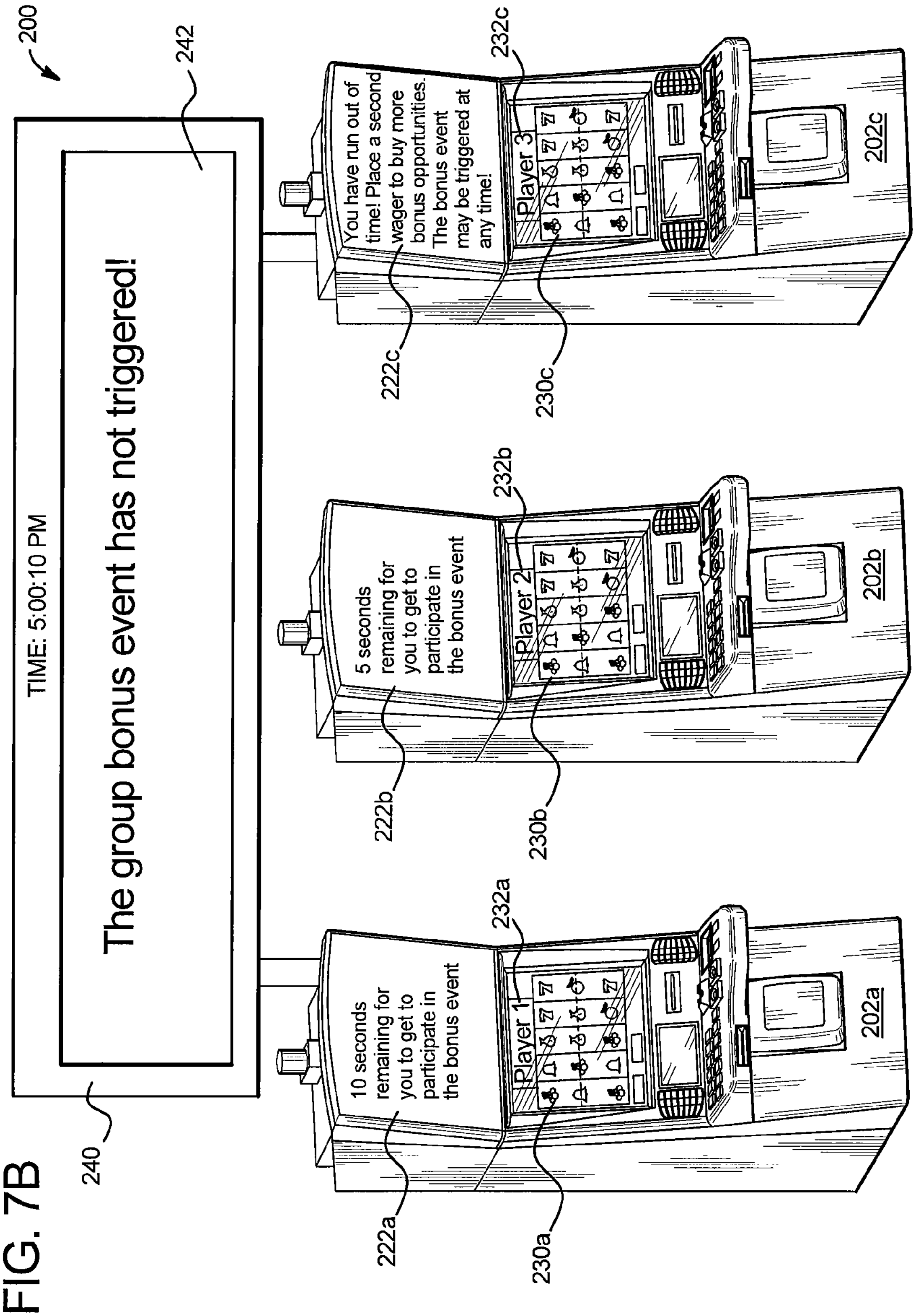

In the example embodiment illustrated in FIGS. 7A and 7B, the gaming system displays to each player a countdown of the time remaining during which the player can win a bonus award.

As seen in FIG. 7A, the gaming devices 202*a*, 202*b* and 202*c* are associated with a shared display 240 configured to display a group bonus event. The shared display 240 further includes a message window 242 for providing the players information and instructions regarding game play. As indicated by the message window 242, the time is now exactly 5 o'clock PM, and the shared random determinations are occurring every 0.5 seconds.

Player 1 232*a* has purchased 40 bonus opportunities, as indicated by the secondary display 222*a* of gaming device 202*a*. Therefore, if the determination is made within the next 20 seconds to provide the group bonus event, the gaming system will enable Player 1 232*a* to participate in the group bonus event. As indicated by the secondary display 222*b* of gaming device 202*b*, Player 2 232*b* has purchased 30 bonus opportunities. If the determination is made within the next 15 seconds to provide the group bonus event, the gaming system will enable Player 2 232*b* to participate in the group bonus event. Player 3 232*c* has purchased 20 bonus opportunities, as indicated by the secondary display 222*c* of gaming device 202*c*. Thus, if the bonus event is triggered within the next 10 seconds, the gaming system will enable Player 3 232*c* to participate in the group bonus event.

As seen in FIG. 7B, ten seconds have elapsed, and the group bonus event has not been triggered. On each player's gaming device, the secondary display device 222*a*, 222*b*, and 222*c* displays a countdown of the time remaining during which the player is eligible to participate in the bonus event. As this moment, Player 1 232*a* has 10 seconds remaining, Player 2 232*b* has 5 seconds remaining, and Player 3 232*c* has run out of time. Thus, Player 1 232*a* and Player 2 232*b* are still eligible to participate in the bonus event, if it is triggered. The secondary display device 222*c* of gaming device 202*c* displays a message prompting Player 3 232*c* to place a second wager to purchase additional bonus opportunities.

It should be appreciated that, in certain embodiments, the shared random determinations are occurring faster than the primary game plays. For example, if a player plays the primary game every three to five seconds, the shared random determination may occur 6 to 10 times during that play of the primary game. Thus, the player may purchase 6 to 10 shared random determinations to stay current.

In one embodiment, the purchasable bonus opportunities are each associated with a multiplier. In such embodiments, when the gaming system randomly determines to provide a bonus award to any players who have bonus opportunities remaining, the amount of the bonus award provided to each player is based in part on the value of the multiplier associated with that player's bonus opportunity. For example, a player purchases a plurality of bonus opportunities, each associated with a 2× multiplier. If, based on the outcome of a shared random determination, the gaming system determines to provide a bonus award of 10 credits to each player who has at least one bonus opportunity remaining, the player will receive a total bonus award of 20 credits (i.e., the base bonus award of 10 credits modified by the 2× multiplier). In certain embodiments where the bonus award includes the chance to participate in a group bonus event, any awards won by a player who participates in the group bonus event are modified by the multiplier associated with that player's purchased bonus opportunity.

In one embodiment, there is a maximum number of bonus opportunities that each player may have at any designated time. In one such embodiment, if a player wishes to purchase a number of bonus opportunities which would cause the player's total number of bonus opportunities to exceed the maximum number, the gaming system enables the player to purchase the bonus opportunities but reduces that player's total number of bonus opportunities to a number that is equal to or lower than the maximum number of bonus opportunities. Additionally, the gaming system adjusts the multipliers associated with a portion of the reduced number of bonus opportunities. In such embodiments, players can purchase additional bonus opportunities even if doing so will cause the player's total number of bonus opportunities to exceed the maximum number. However, the gaming system adjusts the total number of purchased opportunities such that there is a lesser number of opportunities with a higher multiplier.

In one such embodiment, the gaming system adjusts the multipliers linearly. For example, a player playing at one of the gaming devices associated with the bonus event purchases 20 opportunities associated with a 1× multiplier. The maximum number of opportunities that each player can have at any designated time is 20 opportunities. If the player purchases 10 more bonus opportunities (i.e., for a total number of 30 purchased bonus opportunities–10 bonus opportunities above the maximum number permitted per player), the gaming device adjusts or weights the bonus opportunities, such that the player has 10 bonus opportunities associated with a 1× multiplier and 10 bonus opportunities associated with a 2× multiplier. The gaming system may adjust or weight the opportunities in any suitable manner, such that the player remains within the limit for the number of opportunities each player can have.

In one embodiment, for each player, the gaming system uses that player's bonus opportunities which are associated with the highest multiplier values first and works down. For example, if a player has ten bonus opportunities associated with a 2× multiplier and twenty bonus opportunities associated with a 1× multiplier, the gaming system uses the player's bonus opportunities which are associated with the 2× multiplier first. That is, for the next ten shared random determinations that occur, for each shared random determination that results in a designated outcome, the gaming system will provide the player with a bonus award modified by the 2× multiplier. For the next twenty shared random determinations after that, for each shared random determination that results in a designated outcome, the gaming system will provide the player with a bonus award modified by the 1× multiplier. In another embodiment, the gaming system uses each player's bonus opportunities which are associated with the lowest multiplier values first and works up. In various alternative embodiments, the gaming system uses each player's bonus opportunities in a randomly determined order, in a predetermined order, or in any other suitable manner. In another embodiment, the gaming system enables each player to specify the order in which to use that player's bonus opportunities.

Figure 8A:
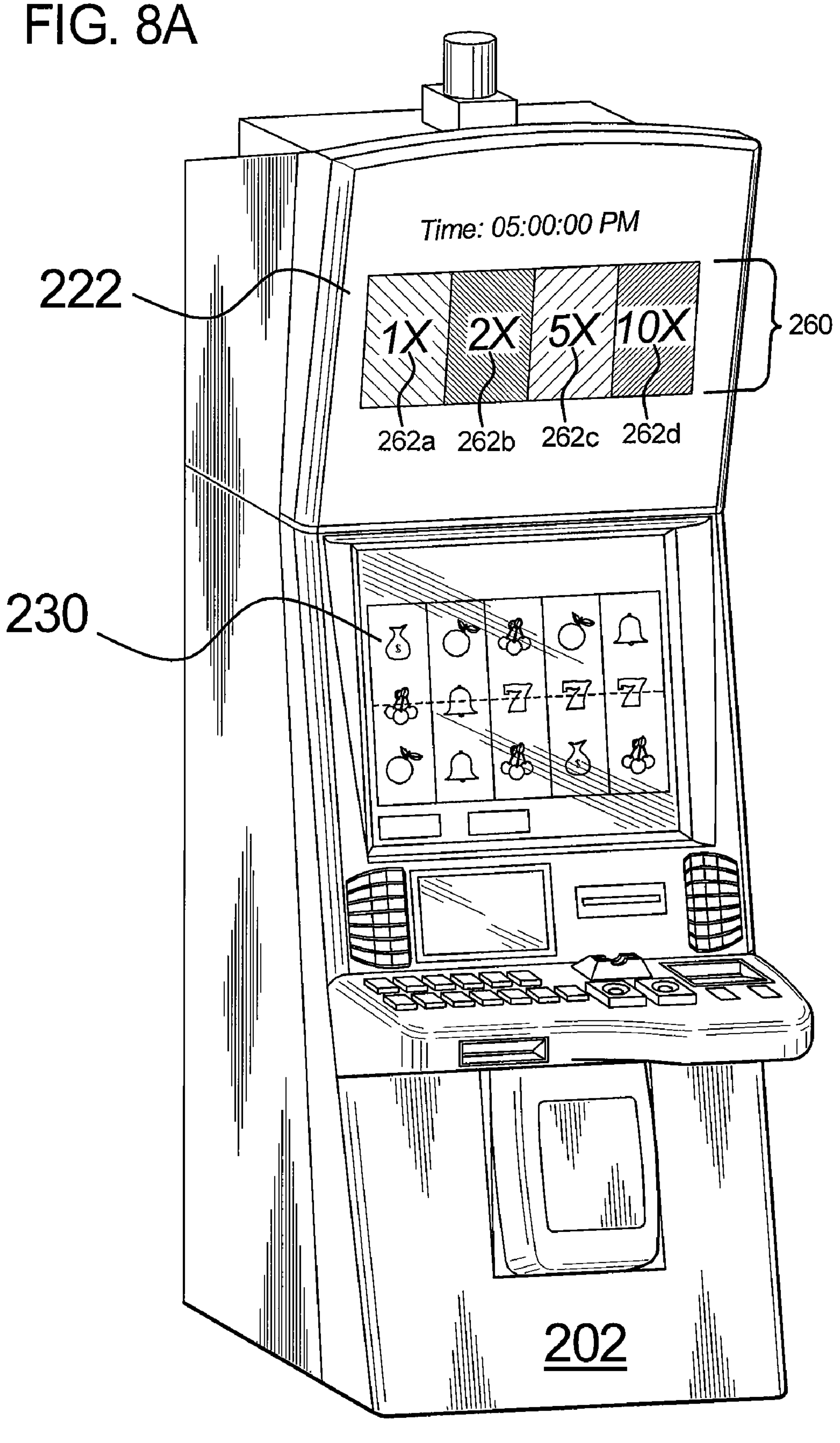
FIGS. 8A and 8B are enlarged views of a display illustrating an example embodiment of the present disclosure which provides a bonus opportunity display bar.
Figure 8B:
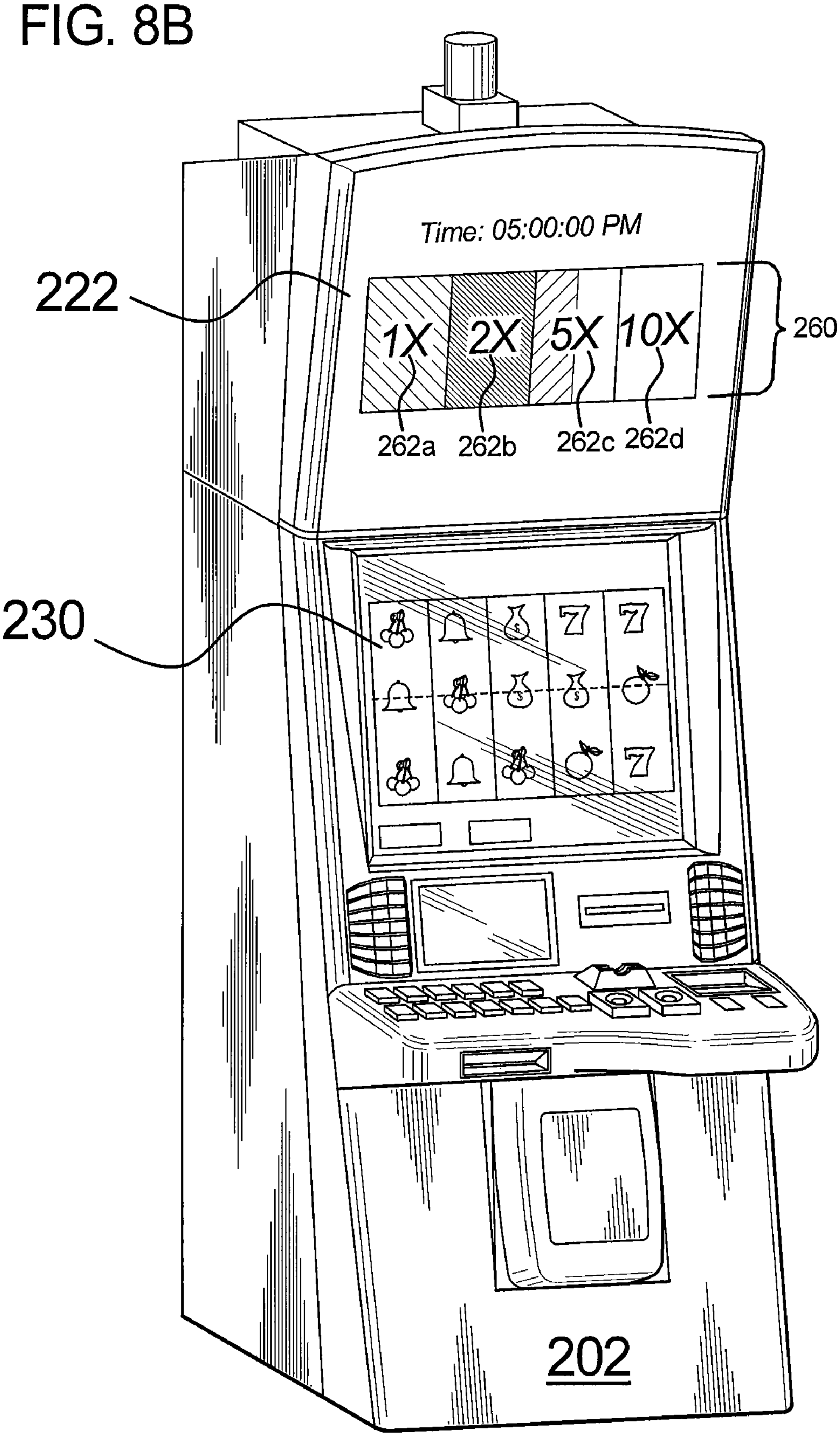

In one embodiment, the gaming system displays to each player how many bonus opportunities that player has left at each multiplier level at any designated time. As illustrated in FIGS. 8A and 8B, in one such embodiment, the gaming system displays a bonus opportunity bar 260 to each player, such as on a display device 222 of that player's gaming device. In one embodiment, the bonus opportunity bar 260 includes a plurality of sections 262*a*, 262*b*, 262*c* and 262*d*, each of the sections associated with a different multiplier. In FIG. 8A, the bonus opportunity bar includes four sections-one section having a 1× multiplier 262*a*, one section having a 2× multiplier 262*b*, one section having a 5× multiplier 262*c*, and one section having a 10× multiplier 262*d*. Each of the sections 262*a*, 262*b*, 262*c* and 262*d* of the bonus opportunity bar includes a different color, represented by different hatching in FIGS. 8A and 8B, to distinguish the different multiplier levels. This enables players to more easily determine how many bonus opportunities they have at each multiplier level at any designated time. In this example, a player can have a maximum of 20 bonus opportunities at each of the different multiplier levels.

As seen in FIG. 8A, the time is exactly 5 o'clock PM. The bonus opportunity bar 260 is completely colored in or shaded, indicating that, at this time, the player has the maximum number of bonus opportunities at each multiplier level. As the player plays the primary game and as the shared random determinations occur, the gaming system uses the player's bonus opportunities starting with the bonus opportunities associated with the highest multiplier (i.e., 10×) first. In this example, the gaming system makes the shared random determinations every 0.5 seconds.

As seen in FIG. 8B, 15 seconds have elapsed. The bonus opportunity bar 260 is no longer completely colored or shaded because some of the player's bonus opportunities have been used. More specifically, in the 15 seconds that passed, 30 shared random determinations occurred. Since the player had 20 bonus opportunities associated with a 10× multiplier, each of those bonus opportunities was used. An additional 10 bonus opportunities associated with the 5× multiplier were also used. Thus, the bonus opportunity bar 260 shows that half of the section 262*c* associated with the 5× multiplier is shaded. The player has 10 bonus opportunities associated with the 5× multiplier remaining. Therefore, if one of the shared random determinations which occurs in the next 5 seconds results in the designated outcome, the gaming system will provide the player with a bonus award modified by 5×. In other embodiments, the gaming system may display a separate bar for each different multiplier level. It should be appreciated that the gaming system may display each player's remaining bonus opportunities and their associated multipliers in any suitable manner.

It should be appreciated that any suitable element of any of the embodiment and examples disclosed herein may be combined. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

a plurality of gaming devices, each of said gaming devices including at least one input device and at least one display device configured to display a primary game operable upon a primary game wager;

at least one processor; and at least one memory device storing a plurality of instructions, which, when executed by the at least one processor, cause the at least one processor to operate with the gaming devices to:

(I) for each of the gaming devices, (a) enable a player to place the primary game wager at said gaming device to cause a play of the primary game;

(b) enable said player to place a second additional wager at said gaming device to purchase a quantity of bonus opportunities, each of said bonus opportunities representing a possibility of participation in a group bonus event, said quantity of bonus opportunities being at least one; and (c) for each play of the primary game wagered on by said player, display a primary game outcome on the at least one display device of said gaming device and provide said player any awards associated with said primary game outcome; and (II) for each of a plurality of designated time intervals:

(a) cause a shared random determination to occur independently of the plays of the primary game, said shared random determination also being distinct from the group bonus event, (b) determine a shared random determination outcome associated with said shared random determination, (c) if said shared random determination outcome includes a designated outcome:

determine whether any of the players has at least one bonus opportunity, and (ii) if any of the players has at least one bonus opportunity:

(A) enable each of said players having at least one bonus opportunity to participate in the group bonus event, (B) determine a group bonus event outcome, and (C) based on the group bonus event outcome, provide at least one bonus award to one or more of said players who participated in the group bonus event, said at least one bonus award being additional to any awards associated with the primary game outcomes, and (d) after the occurrence of the shared random determination, reduce each player's quantity of bonus opportunities by a designated number of bonus opportunities if said player had any bonus opportunities remaining upon said occurrence of the shared random determination.

2. The gaming system of claim 1, wherein the plurality of instructions, when executed by the at least one processor, cause the at least one processor to operate with the gaming devices to enable each of the players to place one of a plurality of second different wagers, each of said second different wagers being associated with a different of bonus opportunities.

3. The gaming system of claim 1, wherein the designated quantity of bonus opportunities is at least one.

4. The gaming system of claim 3, wherein the plurality of instructions, when executed by the at least one processor, cause the at least one processor to operate with the gaming devices to display to each player the quantity of bonus opportunities that said player has remaining at any designated time.

5. The gaming system of claim 1, wherein each of said players is eligible to participate in the group bonus event for a designated period of time based on the of bonus opportunities purchased by said player.

6. The gaming system of claim 5, wherein the plurality of instructions, when executed by the at least one processor, cause the at least one processor to operate with the gaming devices to display to each player, at any designated time, the amount of time remaining during which said player is eligible to participate in the group bonus event.

7. A gaming system comprising:

a plurality of gaming devices, each of said gaming devices including at least one input device and at least one display device configured to display a primary game operable upon a primary game wager;

a central display device configured to display a group bonus event;

at least one processor; and at least one memory device storing a plurality of instructions, which, when executed by the at least one processor, cause the at least one processor to operate with the gaming devices to:

(a) for each of the gaming devices:

(i) enable a player to place the primary game wager at said gaming device to cause a play of the primary game;

(ii) enable said player to place a second additional wager at said gaming device, said second additional wager being associated with a possibility of participation in the group bonus event; and (iii) for each play of the primary game wagered on by said player, display a primary game outcome on the at least one display device of said gaming device and provide said player with any awards associated with said primary game outcome;

(b) cause a shared random determination to occur independently of the plays of the primary game, the shared random determination also being distinct from the group bonus event;

(c) determine a shared random determination outcome associated with the shared random determination; and (d) if the shared random determination outcome includes a designated outcome:

(i) enable one or more of the players who placed the second additional wager to participate in the group bonus event, (ii) determine a group bonus event outcome, and (iii) based on the group bonus event outcome, provide at least one bonus award to one or more of the players who participated in the group bonus event, the at least one bonus award being additional to any awards associated with the primary game outcomes.

8. The gaming system of claim 7, wherein the plurality of instructions, when executed by the at least one processor, cause the at least one processor to operate with the gaming devices to, for each of the of players who placed the second additional wager, enable said player to participate in the group bonus event if said player placed said second additional wager within a designated time period.

9. The gaming system of claim 7, wherein the plurality of instructions, when executed by the at least one processor, cause the at least one processor to operate with the gaming devices to, if the shared random determination outcome includes the designated outcome, enable each of the players who placed the second additional wager to participate in the group bonus event.

* * * * *

UNITED STATES PATENT AND TRADEMARK OFFICE

CERTIFICATE OF CORRECTION

PATENT NO. : 8,231,448 B2
APPLICATION NO. : 11/937933
DATED : July 31, 2012
INVENTOR(S) : Ryan W. Cuddy et al.

It is certified that error appears in the above-identified patent and that said Letters Patent is hereby corrected as shown below:

IN THE CLAIMS

In Claim 1, Column 31, Line 8, before “determine” insert --(i)--.
In Claim 2, Column 31, Line 34, between “different” and “of” insert --quantity--.
In Claim 3, Column 31, Line 37, replace “quantity” with --number--.
In Claim 5, Column 31, Line 45, between “the” and “of” insert --quantity--.

Signed and Sealed this
Twenty-sixth Day of February, 2013

Teresa Stanek Rea
*Acting Director of the United States Patent and Trademark Office*